(12) United States Patent
Johnson et al.

(10) Patent No.: US 9,879,974 B2
(45) Date of Patent: Jan. 30, 2018

(54) LINEAR-MOTION STAGE

(71) Applicants: Kendall B. Johnson, Richmond, UT (US); Gregory R. Hopkins, Logan, UT (US)

(72) Inventors: Kendall B. Johnson, Richmond, UT (US); Gregory R. Hopkins, Logan, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 15/340,356

(22) Filed: Nov. 1, 2016

(65) Prior Publication Data

US 2017/0067731 A1   Mar. 9, 2017

Related U.S. Application Data

(63) Continuation of application No. 14/493,545, filed on Sep. 23, 2014, now Pat. No. 9,513,168.

(51) Int. Cl.
| | |
|---|---|
| *B81B 3/00* | (2006.01) |
| *G01B 9/02* | (2006.01) |
| *G01J 3/453* | (2006.01) |
| *G02B 7/00* | (2006.01) |

(Continued)

(52) U.S. Cl.
CPC ....... *G01B 9/02049* (2013.01); *F16M 11/043* (2013.01); *G01J 3/0202* (2013.01); *G01J 3/4535* (2013.01); *G02B 7/00* (2013.01); *B23Q 2210/00* (2013.01)

(58) Field of Classification Search
CPC ........ B81B 3/00; B81B 3/0051; B81B 7/0006
See application file for complete search history.

(56) References Cited

U.S. PATENT DOCUMENTS

| | | |
|---|---|---|
| 2,793,028 A | 5/1957 | Wheeler |
| 3,501,120 A | 3/1970 | Daniel |
| 3,605,176 A | 9/1971 | Jones |

(Continued)

FOREIGN PATENT DOCUMENTS

EP   2614933 A1   7/2013

OTHER PUBLICATIONS

International Bureau of WIPO, International Preliminary Report on Patentability for PCT/US2014/056886, dated Mar. 28, 2017.

(Continued)

*Primary Examiner* — Jonathan Hansen

(57) ABSTRACT

A linear-motion stage that is angularly or radially symmetric or asymmetric, or monolithic may be used as the moving mechanism in a Fourier transform spectrometer. In embodiments, a linear-motion stage includes a base; a first multiple-arm linkage extending from the base to a first carriage attachment end; a second multiple-arm linkage extending from the first carriage attachment end to the base; a third multiple-arm linkage extending from the base to a second carriage attachment end; a carriage extending from the first carriage end to the second carriage end. Also in embodiments, the first, second, and third multiple-arm linkages comprise a first arm rotateably connected to a second arm through a flexure, the angular travel of the first arm is configured to be different than an angular travel of the second arm as the carriage moves along the carriage motion line.

13 Claims, 23 Drawing Sheets

(51) Int. Cl.
   *F16M 11/04*   (2006.01)
   *G01J 3/02*    (2006.01)

(56) References Cited

U.S. PATENT DOCUMENTS

| | | | |
|---|---|---|---|
| 4,248,103 | A | 2/1981 | Halsall |
| 4,261,211 | A | 4/1981 | Haberland |
| 4,278,351 | A | 7/1981 | Frosch |
| 4,303,018 | A | 12/1981 | Lehmann |
| 4,383,762 | A | 5/1983 | Burkert |
| 4,437,413 | A | 3/1984 | O'Brian |
| 4,545,266 | A | 10/1985 | Brems |
| 4,556,316 | A | 12/1985 | Doyle |
| 4,565,094 | A | 1/1986 | Sedgewick |
| 4,635,887 | A | 1/1987 | Hall |
| 4,688,908 | A | 8/1987 | Moore |
| 4,710,001 | A | 12/1987 | Lacey |
| 4,991,961 | A | 2/1991 | Strait |
| 5,237,887 | A | 8/1993 | Appleberry |
| 5,309,217 | A | 5/1994 | Simon |
| 5,349,438 | A | 9/1994 | Solomon |
| 5,420,489 | A | 5/1995 | Hansen |
| 5,486,917 | A | 1/1996 | Carangelo |
| 6,095,011 | A | 8/2000 | Brogårdh |
| 6,121,599 | A | 9/2000 | Traber |
| 6,141,101 | A | 10/2000 | Bleier |
| 6,246,052 | B1 | 6/2001 | Cleveland |
| 6,260,428 | B1 | 7/2001 | Clement |
| 6,425,303 | B1 | 7/2002 | Brogårdh |
| 6,445,960 | B1 | 9/2002 | Borta |
| 6,453,566 | B1 | 9/2002 | Bottinelli |
| 6,469,790 | B1 | 10/2002 | Manning |
| 6,688,183 | B2 | 2/2004 | Awtar |
| 6,720,551 | B2 | 4/2004 | Cleveland |
| 6,836,968 | B1 | 1/2005 | Walker |
| 6,986,211 | B2 | 1/2006 | Gunderson |
| 7,075,623 | B2 * | 7/2006 | Galburt .............. G03F 7/70766 310/10 |
| 7,245,989 | B2 | 7/2007 | Hosek |
| 7,275,332 | B2 | 10/2007 | Blanding |
| 7,336,409 | B2 | 2/2008 | Sissom |
| 7,480,055 | B2 | 1/2009 | Buijs |
| 7,623,082 | B2 | 11/2009 | Meschini |
| 7,835,077 | B2 | 11/2010 | Rosenqvist |
| 8,072,120 | B2 | 12/2011 | Awtar |
| 8,109,171 | B2 | 2/2012 | Nakao |
| 8,205,853 | B2 | 6/2012 | Bleier |
| 8,310,128 | B2 | 11/2012 | Ferreira |
| 8,390,233 | B2 | 3/2013 | Shilpiekandula |
| 2002/0135240 | A1 * | 9/2002 | Sawada .................. H02K 33/00 310/12.01 |
| 2010/0001616 | A1 | 1/2010 | Ferreira et al. |

OTHER PUBLICATIONS

Gin, B., The design and analysis of a large angular range, two-axis flexure assembly, Department of Mechanical Engineering Massachusetts Institute of Technology (Feb. 1988).

Teichert, G. et al., Design and fabrication of a fully-compliant mechanism for control of cellular injection arrays, 7:5 Production Engineering 561-568 (May 7, 2013), Springer.

Zhao, H. et al., Design of a family of ultra-precision linear motion mechanisms, 4:4 J. Mechanisms Robotics (Sep. 17, 2012), ASME.

Trease, B. et al., Design of large-displacement compliant joints, 127:4 J. Mechanical Design 788-798 (Nov. 7, 2004), ASME.

MacKay, A., Large-displacement linear-motion compliant mechanisms, Department of Mechanical Engineering Brigham Young University (Aug. 2007).

Choi, Y. et al., Kinematic design of large displacement precision XY positioning stage by using cross strip flexure joints and over-constrained mechanism, 43:6 Mechanism and Machine Theory 43: 724-737 (Jun. 2008), Elsevier.

Kim, J. et al., A millimeter-range flexure-based nano-positioning stage using a self-guided displacement amplification mechanism, 50 Mechanism and Machine Theory 109-120 (Apr. 2012), Elsevier.

Chen, G. et al., Multistable behaviors of compliant sarrus mechanisms, 5:2 J. Mechanisms and Robotics (Mar. 26, 2013), ASME.

NASA, 29th Aerospace Mechanisms Symposium (May 17-19, 1995), NASA.

Hakun, C. et al., A cryogenic scan mechanism for use in fourier transform spectrometers, 29th Aerospace Mechanisms Symposium 316-349 (May 17-19, 1995), NASA.

Zhao, H. et al., A novel compliant linear-motion mechanism based on parasitic motion compensation, 50 Mechanism and Machine Theory 15-28 (Dec. 16, 2011), Elsevier.

Hoover, A. et al., Analysis of off-axis performance of compliant mechanisms with application to mobile millirobot design, IEEE/RSJ International Conference on Intelligent Robots and Systems 2770-2776 (Oct. 10-15, 2009), IEEE.

Chen, Y. et al., Spatial overconstrained linkages—the lost jade, 15 Explorations in the History of Machines and Mechanisms—History of Mechanism and Machine Science 535-550 (2012), Springer.

PI, PI 1998-2005 Cat. 118 05/09.17,Tutorial: Piezo-electronics in positioning—parallel and serial kinematics/metrology.

PI, PI 1998-2005 Cat. 118 05/09.17,Nanopositioning & scanning systems—introduction to piezo flexure nanopositioners and scanners.

Dijksman, E., True straight-line linkages having a rectilinear translating bar, Advances in Robot Kinematics and Computational Geometry 411-420 (1994), Kluwer Academic Publishers.

* cited by examiner

Fourier Transform Interferometer

Corner Cube Reflector

DEGREES OF FREEDOM

LINEAR MOTION

OVER-CONSTRIANED LINEAR MOTION

Porch Swing Carriage with Planar Mirror

Porch Swing Carriage with Cube Reflector

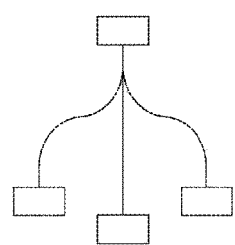
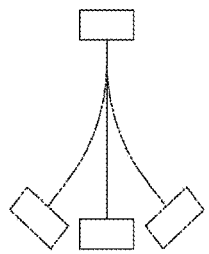
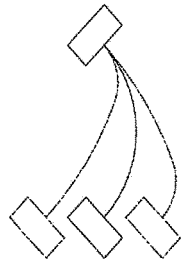
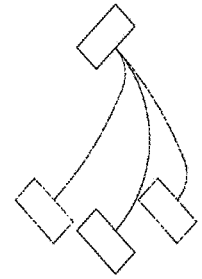
FIG. 6A
Prior Art
FIG. 6B
Prior Art
FIG. 6C
Prior Art
FIG. 6D
Prior Art
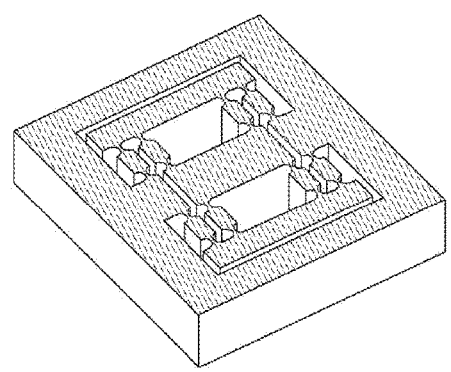
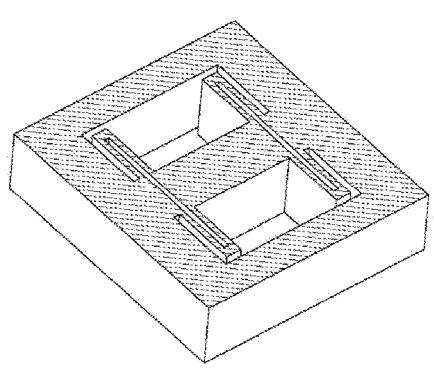
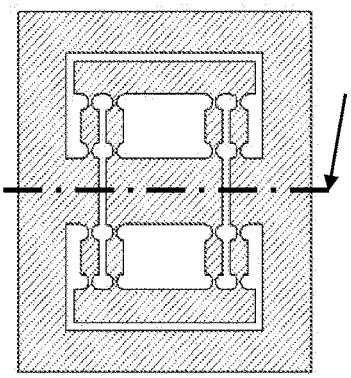
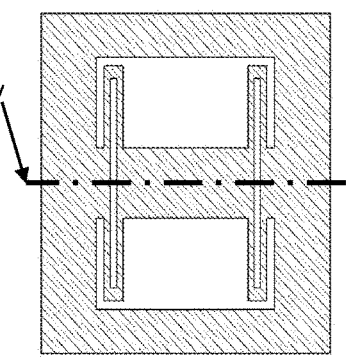
FIG. 6E
Prior Art
FIG. 6F
Prior Art

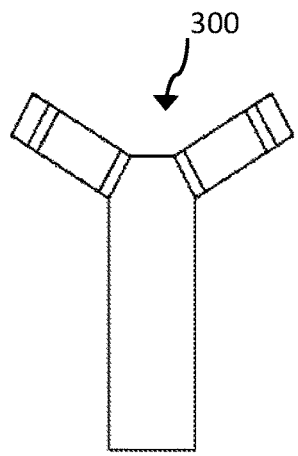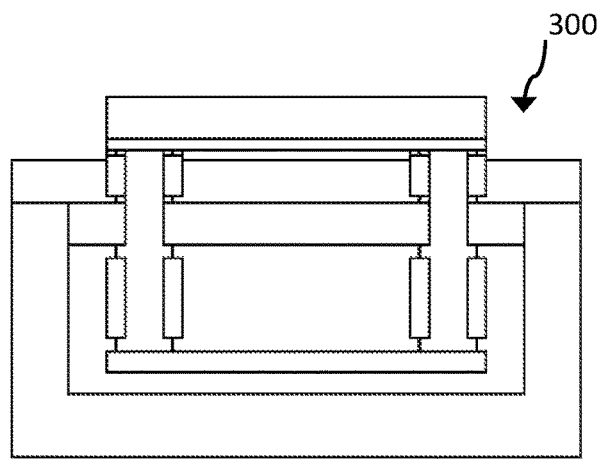
FIG. 8A  FIG. 8B
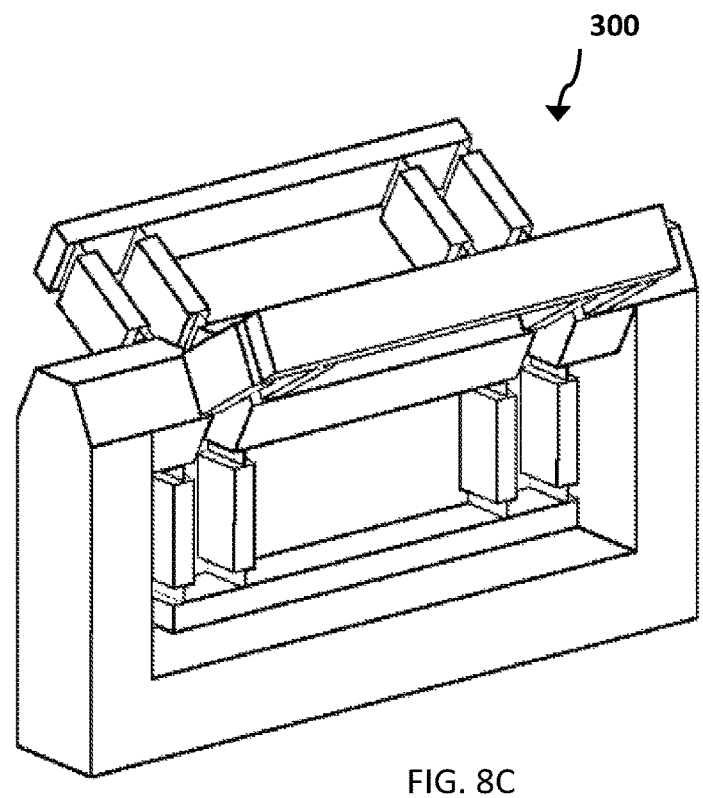
FIG. 8C

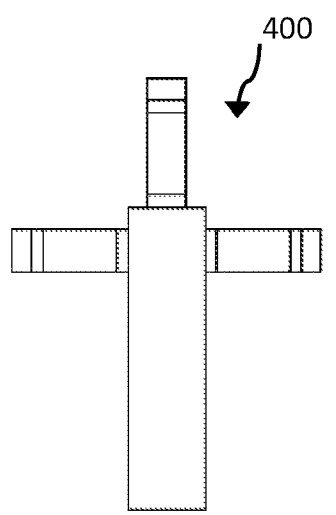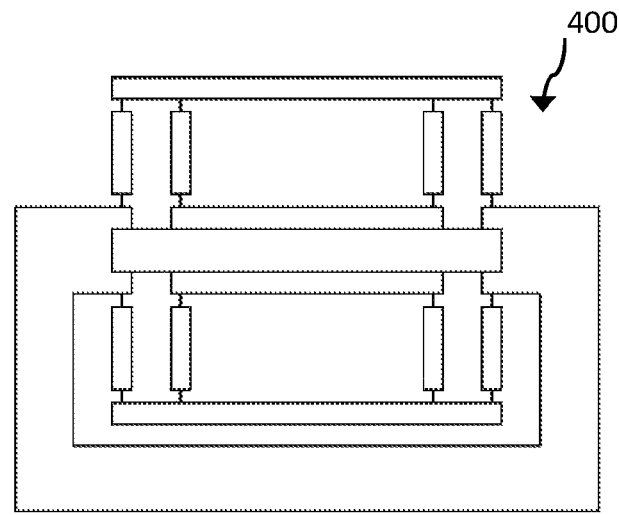
FIG. 9A          FIG. 9B
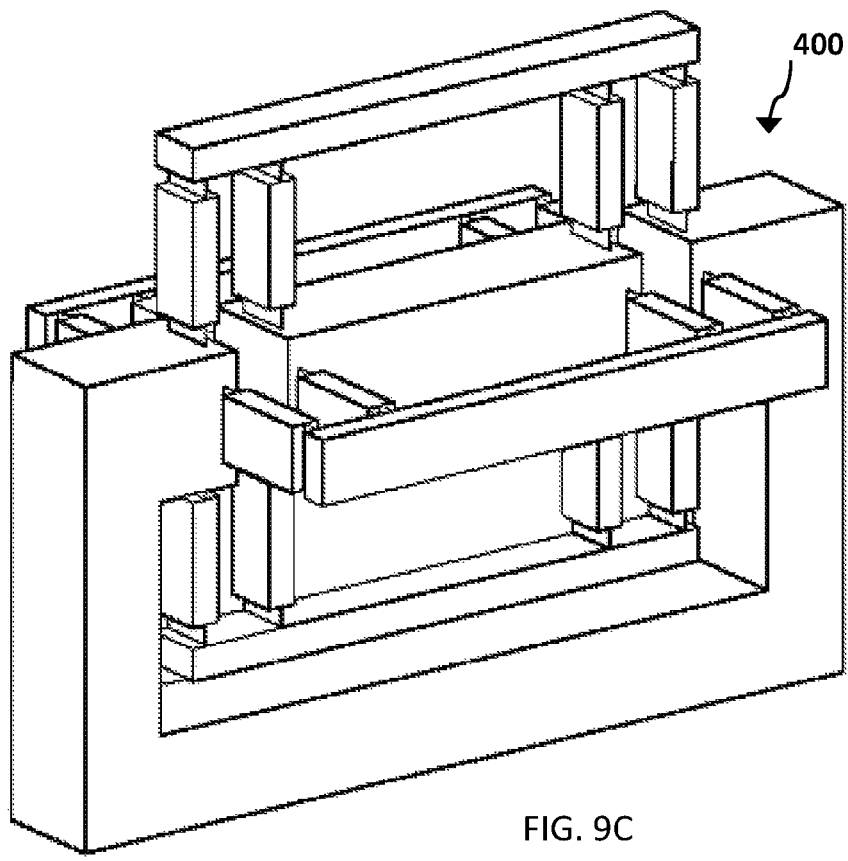
FIG. 9C

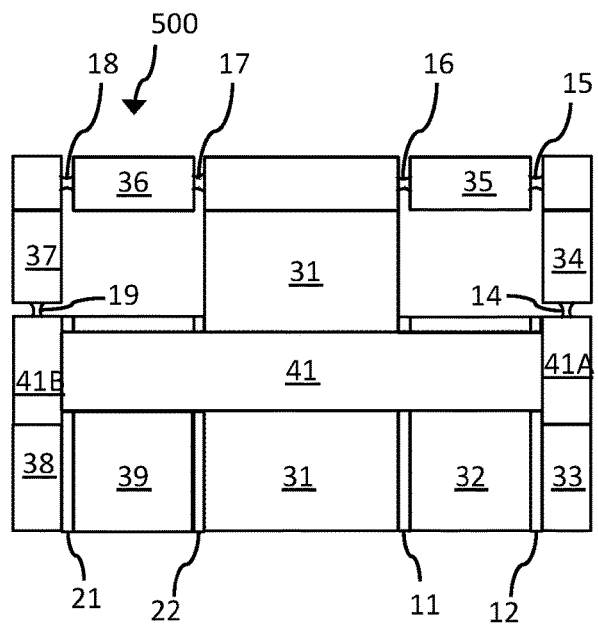
Top View
FIG. 16A
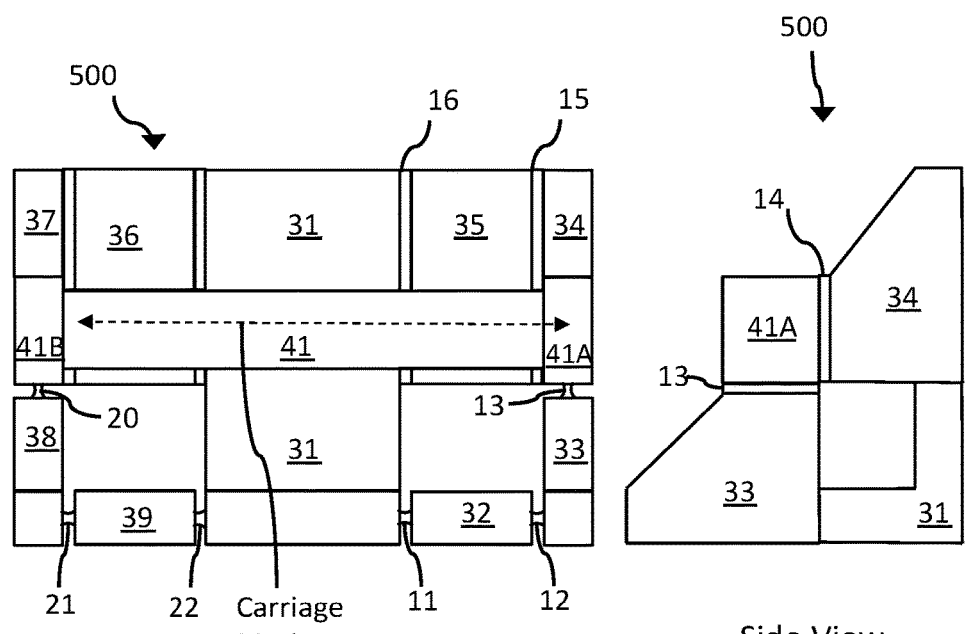
Elevation View
FIG. 16B
Side View
FIG. 16C Top View Elevation View

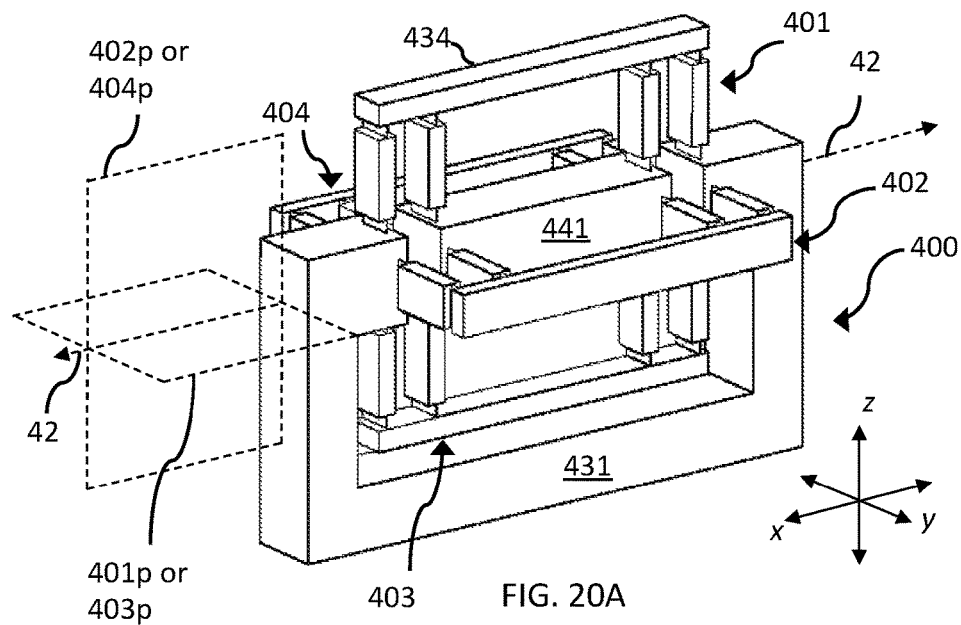
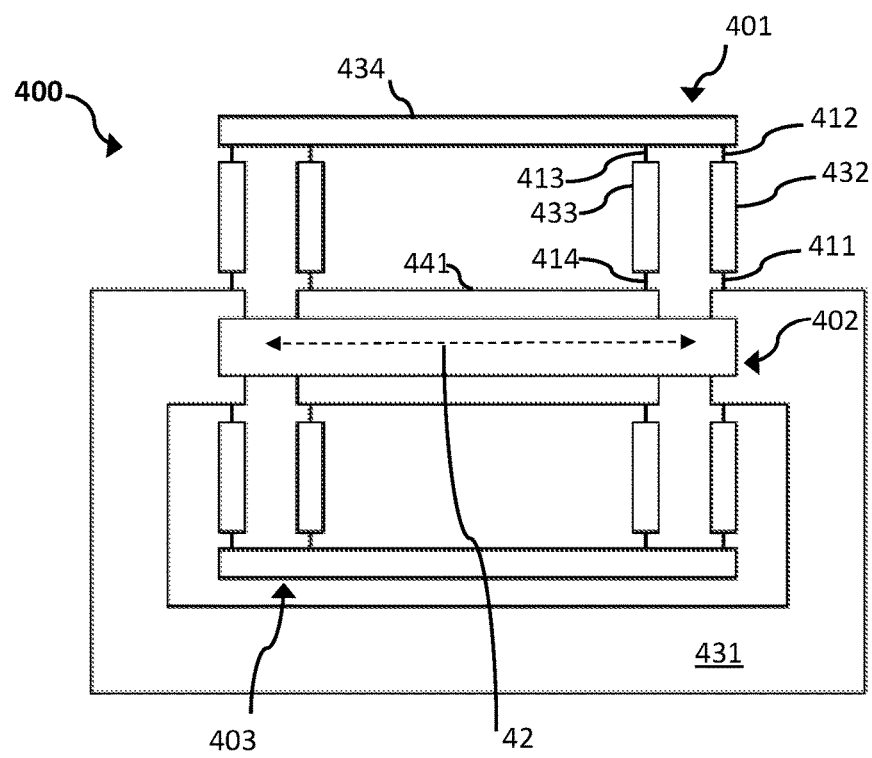

LINEAR-MOTION STAGE

CROSS-REFERENCE TO RELATED APPLICATIONS

This is a continuation application of and claims priority to U.S. patent application Ser. No. 14/493,545 entitled "LINEAR-MOTION STAGE" and filed on Sep. 23, 2014 for Kendall B. Johnson and Gregory R. Hopkins, which is incorporated herein by reference.

TECHNICAL FIELD

The present disclosure relates to a linear-motion stage.

BACKGROUND

I. Linear-Motion Stages

A linear-motion stage is part of a motion system designed to restrict motion of an object along a linear path. A linear stage usually includes a platform and a base, wherein the platform movement is restricted, relative to the base, along a line. A linear stage may be used in manufacturing equipment or machines including robots, machine tools, assembly, semiconductor equipment, laser equipment, electronic manufacturing equipment, atomic force microscopy (AFM), micro electrical mechanical devices (MEMS), pick and place systems, scanning devices, biomedical devices, or other industrial automation applications. A linear stage may also be used in a variety of optical applications, including a microscopic stage, an optic lab stage, an optical fiber alignment system, an optical stage, or as an interferometer mirror translation stage in a Fourier transform spectrometer.

II. The Interferometer

A Fourier transform spectrometer usually includes a Michelson interferometer. A Michelson interferometer has a light source, a detector, a beam splitter, and two mirrors or reflectors, with one of the mirrors configured to move along a linear path. FIG. 1A illustrates a Michelson interferometer 50 with a planar moving mirror. The mirrors in a Michelson interferometer 50 may be planar mirrors or corner cube reflectors. FIG. 1B illustrates a corner-cube reflector 60. A corner-cube reflector 60 has mutually perpendicular intersecting flat surfaces, which reflect radiation directly back towards the source, parallel to the incoming beam.

As illustrated in FIG. 1A, radiation from a radiation source strikes a beamsplitter and directs the radiation path towards two mirrors. The radiation or radiation source is usually an ultra-violet ("UV"), visible, or infrared (IR) light source. The radiation reflects off the two mirrors and recombines at the beamsplitter before being redirected towards a detector.

The interferometer creates an optical path difference between two radiation paths or beams by moving or translating the moving mirror along a translational, linear path. When recombined at the beamsplitter, beams reflecting from the fixed and moving reflecting surfaces combine with constructive or destructive interference depending on the difference in distance of the two optical paths. The recombined beam produces an interferogram, or a plot of light intensity as a function of optical path difference. The interferogram is a measurement of the combined beams' intensity as a function of time or the movement of the moving reflecting surface. A Fourier transform may be used to transform the interferogram's signal in the time domain to a frequency domain or spectrum.

III. Straight-Line Movement in an Interferometer

A. Motion Constraints and Degrees of Freedom

The Michelson interferometer described above requires a translational mechanism or carriage to transport the moving mirror along a translational, linear path. The intent of a translational mechanism or carriage in a Michelson interferometer is to control the direction and extent the moving mirror may travel. Directions in which a translational mechanism can move are theoretically defined by the Cartesian coordinate system as three X, Y, and Z vectors in which a mechanism can translate or rotate. FIG. 2A illustrates an example Cartesian coordinate system. The motions illustrated in FIG. 2A constitute a total of six Degrees of Freedom (DOF). A mechanism may control an object's direction of motion by constraining or limiting the DOF to which it can move. For example, a three-DOF mechanism may be free to move in two translation DOF (X, Z) and one rotation DOF (Y), which defines planar motion in an X-Z plane. In another example, a one-DOF linear mechanism constrains motion to a line. FIG. 2B illustrates motion constrained to a line. The line may be along the Y-axis shown in FIG. 2A.

Over-constrained mechanisms are usually unable to move, or not able to move well, in any direction or in any of the six DOF unless the mechanism is designed, manufactured, or aligned so that over constraining components substantially allow motion in the intended direction. Another solution for over constraint is to increase the mechanism's compliance, or allowing the mechanism to move in directions other than the mechanism's intended direction of motion such that the compliance alleviates the over constraint. FIG. 2C illustrates over-constrained linear motion: a first translational component may constrain motion within a first plane, a second translational component may constrain motion within a second plane, and a third translational component may constrain motion within a third plane. If the first, second, and third planes are not parallel to a common line, do not intersect along a common line, or if the intersection of the third plane is not parallel to a line formed by the intersection of the first two planes, as illustrated in FIG. 2C, the total allowable motion may be over-constrained.

B. The Porch Swing

The "porch swing" carriage has been used for moving or translating the moveable mirror in an interferometer. FIGS. 3A and 3B illustrate a porch swing with a planar reflecting surface and a corner cube reflector, respectively. The corner cube in FIG. 3B illustrates a corner cube reflector as a right-angle reflecting surface. In both FIGS. 3A and 3B, the reflecting surface moves between a "Left", "Center", and "Right" position, e.g., the mirror displacement, to create the optical path difference. In FIGS. 3A and 3B, the solid lines illustrate the reflecting surface and the solid-arrow lines illustrate radiation paths with the reflecting surface in the center position. The dashed lines and dashed-arrow lines in FIGS. 3A and 3B illustrate the reflecting surface and radiation paths with the reflecting surface in the right and left positions.

FIG. 3A illustrates that for a flat mirror, as the reflecting surface moves between the mirror displacement positions, the tilt of the flat mirror can cause a corresponding tilt or angular deviation of the reflected beam. FIG. 3B illustrates that for a corner-cube mirror, as the reflecting surface moves laterally between the mirror displacement positions, the reflecting surface moves up and down (e.g., lateral displacement or shear movement vertically, as illustrated) due to the fixed distance between the connection point on the reflecting surface and the top of the swing. The vertical displacement of the corner-cube mirror between mirror lateral positions can cause a shear or vertical displacement of the reflected beam. Angular deviation or shear displacement of the reflected beam can degrade an interferometer's performance.

SUMMARY

The inventors of the present disclosure have identified the need for a linear-motion stage with very low tilt and shear that may be used in any high-precision linear motion application, including an interferometer. The present disclosure in aspects and embodiments addresses this need and problem by providing, for example, linear-motion stages that are radially symmetric or asymmetric, angularly symmetric or asymmetric, and monolithic or an assembly of parts. The linear motion stages may be suitable for applications requiring high-performance true linear motion. For example, linear motion stages described in the present disclosure may be used as a linear stage in manufacturing equipment or machines including robots, machine tools, assembly, semiconductor equipment, laser equipment, electronic manufacturing equipment, atomic force microscopy (AFM), micro electrical mechanical devices (MEMS), pick and place systems, scanning devices, biomedical devices, or other industrial automation applications.

The linear motion stages may also be used to move a corner-cube reflector or planar mirror in a Fourier transform spectrometer. A linear motion stage's design may be such that the corner cube's reflected beam direction and location remains nearly unchanged as a function of the mirror displacement. An important benefit of the design is that it may reduce or eliminate the need for stage alignment, which greatly simplifies its implementation and cost. Embodiments of linear motion stages of the present disclosure may also have little or no stiction or hysteresis issues.

In embodiments, a linear-motion stage comprises a base; a first multiple-arm linkage extending from the base to a first carriage attachment piece; a second multiple-arm linkage extending from the first carriage attachment piece to the base. In this embodiment, the first multiple-arm linkage constrains a motion of the first carriage attachment piece to motion in a first plane and the second multiple-arm linkage constrains the first carriage attachment piece to motion in a second plane. Also, the first and second planes intersect at a plane intersection line and the first and second multiple-arm linkages constrain the motion of the first carriage attachment piece along a carriage motion line, the carriage motion line being parallel to the plane intersection line. Also, the first and second multiple-arm linkages are arranged angularly asymmetric with respect to a plane transverse to the plane intersection line.

In a further aspect of the present disclosure, the first and second multiple-arm linkages are arranged radially asymmetric about the carriage motion line. In another embodiment, the first carriage attachment piece is fully balanced such that a center of gravity of the first carriage attachment piece is located in a balancing plane formed by a first flexure extending from the first multiple-arm linkage to the first carriage piece and a second flexure extending from the first carriage piece to the second multiple-arm linkage.

In another linear motion stage, the first multiple-arm linkage and the second multiple-arm linkage attach to the carriage attachment piece at an attachment plane, the attachment plane being orthogonal to the plane intersection line. At least a portion of one of the first or second multiple-arm linkages may be homogeneously formed of a single material, having a joint-free continuity of the single material from a first flexure to a rigid element. Additionally, the rigid element may have a rigid-element section moduli and the flexure may have a flexure-section moduli, the rigid-element section moduli being orders of magnitude greater than the flexure-section moduli.

In another embodiment, a linear motion stage includes a third multiple-arm linkage extending from the base to a second carriage attachment piece. In another embodiment, a linear motion stage includes a carriage extending from the first carriage attachment piece to the second carriage attachment piece along the carriage motion line.

In another aspect of the present disclosure, the linear-motion stage further comprises a third multiple-arm linkage extending from the base to a second carriage attachment piece. Additionally, the third multiple-arm linkage may constrain a motion of the carriage to motion in the second plane. Also, the linear-motion stage may comprise a carriage extending from the first carriage attachment piece to the second carriage attachment piece along the carriage motion line. In another embodiment, the third multiple-arm linkage constrains a motion of the carriage to motion in a third plane; the third plane is non-parallel to the first and second plane; and the third plane is parallel to the plane intersection line. Additionally, the third multiple-arm linkage comprises three, third multiple-arm linkage flexures, the three, third multiple-arm linkage flexures may form three corresponding third multiple-arm linkage rotation axes that are substantially parallel to each other.

Each of the first, second, and third multiple-arm linkages mays comprise a set of three flexures and two rigid elements, wherein each set of the three flexures and two rigid elements are connected in series. In another embodiment, the rigid elements have a rigid-element section moduli and the flexures have a flexure-section moduli, the rigid-element section moduli being orders of magnitude greater than the flexure-section moduli.

A linear-motion stage may further comprise a fourth multiple-arm linkage extending from the second carriage attachment piece to the base, wherein the fourth multiple-arm linkage constrains the motion of the carriage to motion in the first plane. In another embodiment, the first multiple-arm linkage attaches to the carriage attachment piece at a first attachment plane; the second multiple-arm linkage attaches to the carriage attachment piece at a second attachment plane; the third multiple-arm linkage attaches to the carriage attachment piece at a third attachment plane; and the fourth multiple-arm linkage attaches to the carriage attachment piece at a fourth attachment plane.

In another embodiment, a linear-motion stage comprises a base; first, second, and third multiple-arm linkages extending from the base to two ends of a carriage. In this embodiment, the first, second, and third multiple-arm linkages constrain motion to first, second, and third motion-constrained planes. Additionally, the first, second, and third motion-constrained planes may be parallel to a common line, the common line being parallel to carriage motion line. Also, the first, second, and third multiple-arm linkages constrain the motion of the carriage along a carriage motion line, the carriage motion line being parallel to the plane intersection line.

In another embodiment, the first, second, and third multiple-arm linkages are arranged radially symmetric around the carriage motion line. A linear-motion stage may further comprise a fourth multiple-arm linkage extending from the base to the two ends of the carriage. In this embodiment, the first, second, third, and fourth multiple-arm linkages may be arranged radially symmetric around the carriage motion line.

In other aspects of the present disclosure, at least a portion of one of the first or second multiple-arm linkages is homogeneously formed of a single material, having a joint-free continuity of the single material from a first flexure to a rigid element.

A linear motion stage may include a base; a first carriage end and a carriage extending from the first carriage end to a second carriage end; and first, second, and third multiple arm linkage sets. In this embodiment, the first multiple arm linkage set comprises a first flexure extending from the base to a first rigid element; a second flexure extending from the first rigid element to a second rigid element; and a third flexure extending from the second rigid element to the first carriage end. Additionally, the second multiple-arm linkage comprises a fourth flexure extending from the first carriage end to a third rigid element; a fifth flexure extending from the third rigid element to a fourth rigid element; and a sixth flexure extending from the fourth rigid element to the base. Also, the third multiple-arm linkage comprises a seventh flexure extending from the base to a fifth rigid element; an eighth flexure extending from the fifth rigid element to a sixth rigid element; and a ninth flexure extending from a sixth rigid element to the second carriage end. Additionally, the first, second, and third flexures form corresponding first, second, and third rotation axes that are substantially parallel to each other. Similarly, the fourth, fifth, and sixth flexures form a corresponding fourth, fifth, and sixth axis that are substantially parallel to each other and substantially orthogonal to the first, second, and third axis. Finally, the seventh, eighth, and ninth flexures form a corresponding seventh, eighth, and ninth axis that are substantially parallel to each other and the fourth, fifth, and sixth axes.

In a further aspect of the present disclosure, a linear-motion stage comprises a base; first, second, and third multiple-arm linkages extending from the base to two ends of a carriage. In this embodiment, the first, second, and third multiple-arm linkages constrain motion to first, second, and third motion-constrained planes, the first, second, and third motion constrained planes intersecting at a plane intersection line. Also, the first, second, and third multiple-arm linkages constrain the motion of the carriage along a carriage motion line, the carriage motion line being parallel to the plane intersection line. Additionally, at least portion of one of the first, second, or third multiple-arm linkages is homogeneously formed of a single material, having a joint-free continuity of the single material from a flexure to a rigid element.

Additionally, the first, second, and third multiple-arm linkages may be arranged radially symmetric around the carriage motion line. Also, a linear motion stage may include a fourth multiple-arm linkage extending from the base to the two ends of the carriage. In another embodiment, the first, second, third, and fourth multiple-arm linkages are arranged radially symmetric around the carriage motion line.

In another embodiment, the first, second, and third multiple-arm linkages each comprise a first blade flexure extending from the base to respective first, second, and third rigid elements and the first, second, and third multiple-arm linkages each comprise a second blade flexure extending from their respective first, second, and third rigid element to the base.

In another embodiment, a method for moving a device comprises moving the device along a linear path using the linear-motion stage of any of the embodiments described above.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are part of the specification. Together with the following description, these drawings demonstrate and explain various principles of the instant disclosure.

FIG. 6A illustrates motion of a flexure.

FIG. 6B illustrates rotational motion of a flexure.

FIG. 6C illustrates rectilinear motion of a flexure.

FIG. 6D illustrates motion of another flexure.

FIGS. 6E and 6F illustrate plan and isometric views of two fine-positioning linear stages.

FIG. 8A illustrates an end view of an angularly and radially symmetrical three-arm linear-motion stage.

FIG. 8B illustrates a side view of the linear-motion stage in 8A.

FIG. 8C illustrates an isometric view of the linear-motion stage in 8A and 8B.

FIG. 9A illustrates an end view of an example angularly and radially symmetrical four-arm linear-motion stage.

FIG. 9B illustrates a side view of the linear-motion stage in 9A.

FIG. 9C illustrates an isometric view of the linear-motion stage in 9A and 9B.

FIGS. 16A-16 C illustrate top, elevation, and side views, respectively of the linear-motion stage of FIG. 15A.

FIG. 20A illustrates an isometric view of an example, angularly and radially symmetrical, four-arm linear-motion stage.

FIG. 20B illustrates a side view of the linear-motion stage in 20A.

Figure 1A:
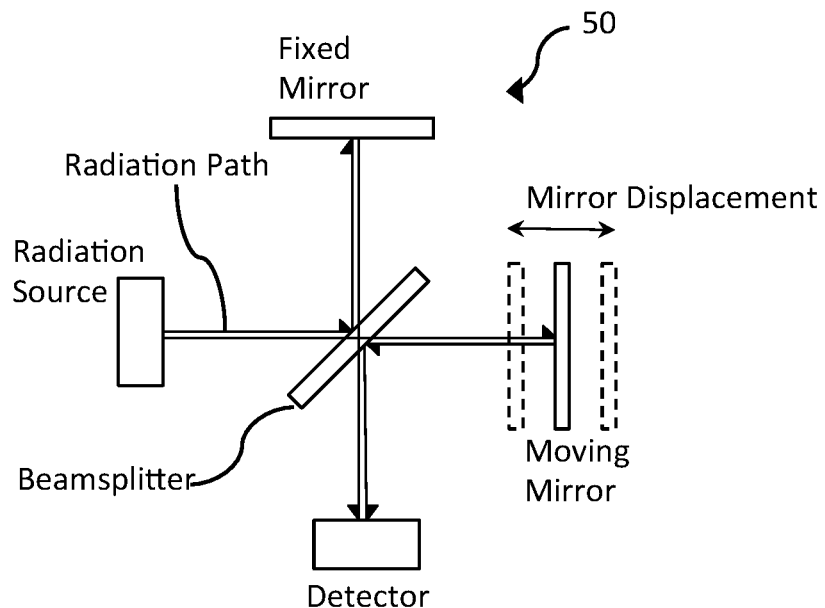
FIG. 1A illustrates the motion of a Michelson interferometer.

While the embodiments described herein are susceptible to various modifications and alternative forms, specific embodiments have been shown by way of example in the drawings and will be describe in detail herein. However, the exemplary embodiments described herein are not intended to be limited to the particular forms disclosed. Rather, this disclosure covers all modifications, equivalents, and alternatives falling within the scope of the appended claims.

DETAILED DESCRIPTION

The present disclosure covers apparatuses and associated methods for a multiple arm linkage linear carriage that may be used as a linear-motion stage. In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional", "optionally", or "or" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

IV. The Sarrus Linkage

Figure 4A:
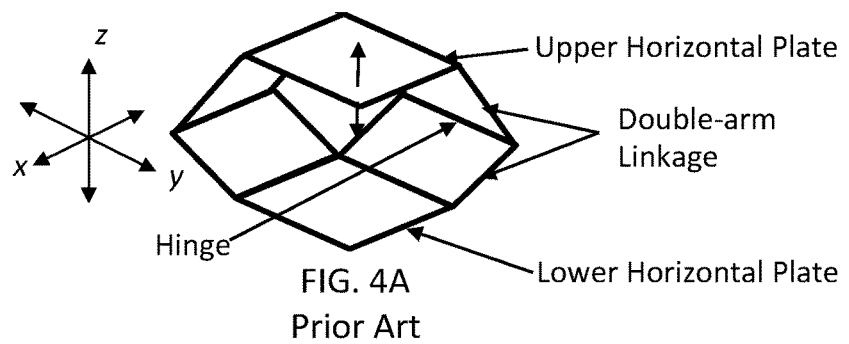
FIG. 4A illustrates a traditional Sarrus linkage.

The Sarrus linkage may be used for moving or translating a carriage in a linear-motion stage. The Sarrus linkage is a mechanism that controls motion to a line. FIG. 4A illustrates a Sarrus linkage with a lower horizontal plate, an upper horizontal plate, and two double-arm linkages with their respective hinges.

Linkage configurations, or the geometry of linkage configurations, are referred to in this disclosure as "symmetrical" and "asymmetrical." Symmetry is the correspondence of size, angle, or arrangement of parts on opposite sides of a plane. There are at least two types of geometric symmetry or asymmetry related to linkage configurations. A first type is radial symmetry, or the radial spacing of linkage arms around an axis or line of motion. A second type is angular symmetry, or how the angles of each link of a double-arm linkage are symmetric about a plane transverse to the travel direction through the linkage set's entire range of motion. For example, FIGS. 4A and 4B illustrate a Sarrus linkage that is radially asymmetric but angularly symmetric.

The Sarrus linkage is traditionally constructed of two double-arm linkages with equal length-arms, i.e., angularly symmetric. A Sarrus linkage also has linkages radially spaced 90-degrees about the direction of motion (the Z-axis in FIG. 4A), i.e., radially asymmetric. Each double-arm linkage defines a 3-DOF planar motion in which the free end can move. For example, one double-arm linkage constrains motion of the upper horizontal plate (relative to the lower-horizontal plate) to motion in the X-Z plane and Y-rotation. The other double-arm linkage constrains motion of the upper horizontal plate (again relative to the lower-horizontal plate) to motion in the Y-Z plane and X rotation. Because the two linkage sets are radially spaced at 90-degrees relative to each other, i.e., radially asymmetric, their different planes of motion intersect along the Z-axis. This intersection line constrains the free-end motion of each link to linear movement along the Z-axis.

Figure 4B:
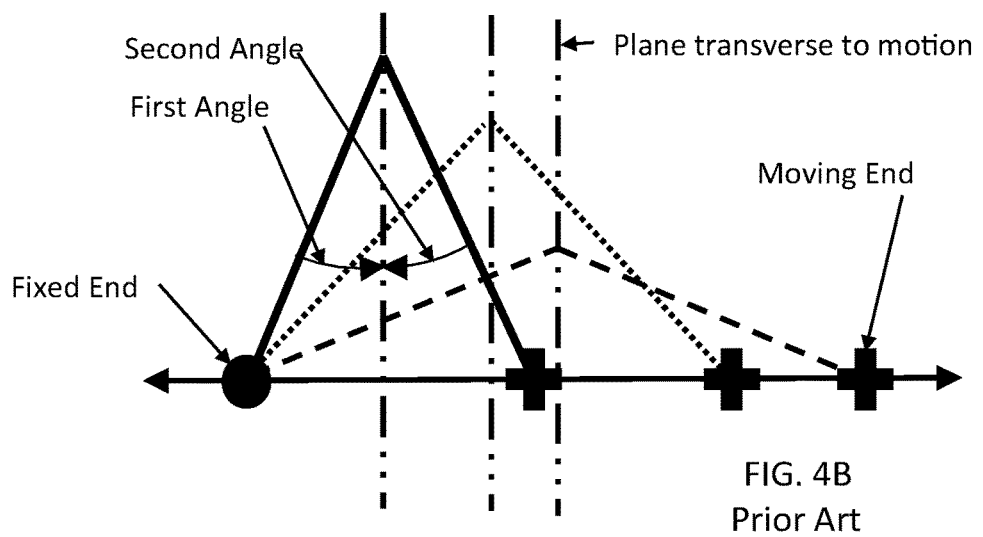
FIG. 4B illustrates the motion of one double-arm linkage of a Sarrus linkage.
Figure 4C:
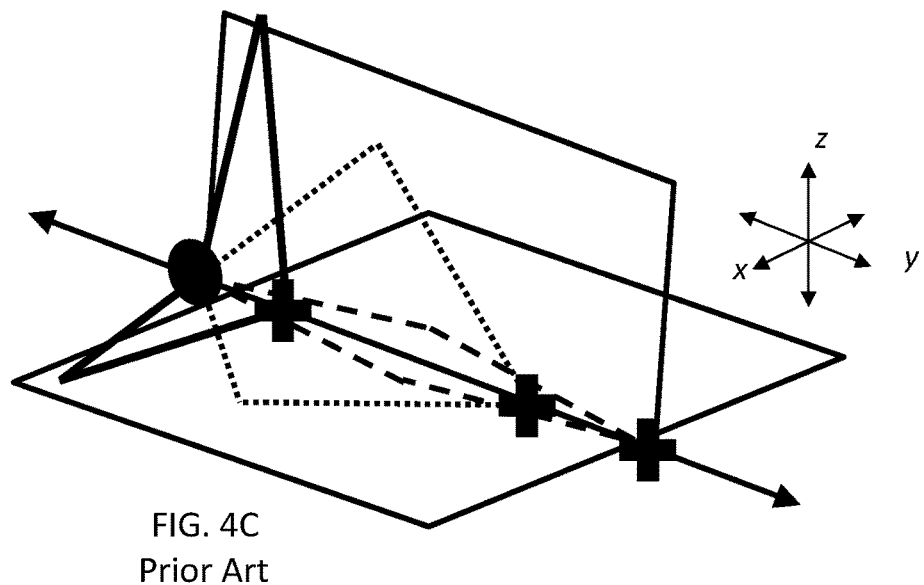
FIG. 4C illustrates the motion of both double-arm linkages in a traditional Sarrus linkage.

FIG. 4B illustrates the motion of one double-arm linkage of a Sarrus linkage. FIG. 4C illustrates in an isometric view the motion of both double-arm linkages in a Sarrus linkage. The fixed end of each linkage is illustrated with a filled-in circle or dot and the moving end is illustrated as a cross, shown in three different positions. The dashed lines illustrate the different positions of the double-arm linkages.

The design of the traditional Sarrus linkage is such that when a double-arm is at the fully extended, extreme end of travel, its two links, or arms, are parallel to each other. Both FIGS. 4A and 4B illustrate that in a typical Sarrus linkage configuration, each rigid element or link of each double-arm is the same length. Additionally, the angles formed between each link of a double-arm to a plane transverse to the travel direction are equal through the entire range of motion, e.g. angularly symmetric. For example, in FIG. 4B, the "First Angle" is the angle formed between the first rigid link and the plane transverse to the travel direction. Similarly, the "Second Angle" is the angle formed between the second rigid link and the plane transverse to the travel direction. In a traditional Sarrus linkage, the First and Second Angles are equal to each other throughout the range of travel. This is also true in the Sarrus linkage illustrated in FIG. 4A: the angles formed between the rigid links and the plane transverse to the travel direction are equal throughout the linkages' range of motion.

A. Linkages, Flexures, and Means for Moving a Sarrus Linkage

1. Linkages

One method of moving a Sarrus linkage through its range of motion is through linkages. Linkages are used in industrial machinery to transfer movement from one component to another. A linkage is commonly an assembly of parts made of rigid links joined together at one degree-of-freedom pivot points. A pivot point joins rigid links using bearings, bushings, or flexures. Current linkage applications include the reciprocating gasoline engine, car suspensions, pumps, bottle openers, etc.

2. Flexures

Flexures deflect and deform within the elastic region of the material of which the flexure is made. In embodiments, a flexure may be simply one or more metal pieces with a thin cross-section as compared to attached rigid members. Typically, a flexure is made of metal, and flexures may be formed to be of a suitable dimension such that they operate at all times within the elastic deformation region, as opposed to plastic deformation, of the metal in which they are formed.

Flexures are components with a thin flexible region that joins rigid elements together. The thin region is allowed to flex or bend to achieve motion. FIGS. 5A-5D illustrate various flexures. Typically, increasing the flexible region of a flexure increases its range of motion and decreases it movement accuracy. Said differently, a flexure's ability to accurately move is inversely proportional to the extent it can move. Flexures either rigidly connect to, or are monolithically integral to, rigid elements. Flexures are not typically designed to stretch or compress as coil springs do. To the inventors' knowledge, no one has built or taught a Sarrus linkage with flexures, or monolithically constructed with flexures.

Figure 5A:
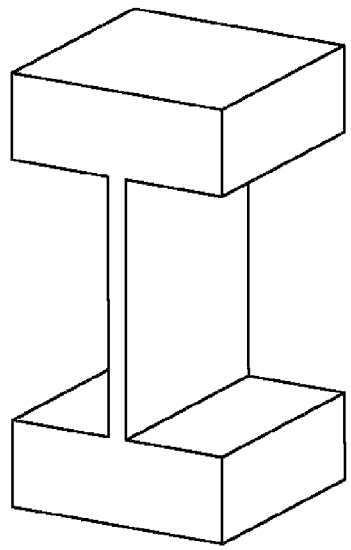
FIGS. 5A-5D illustrate various flexures.
Figure 5B:
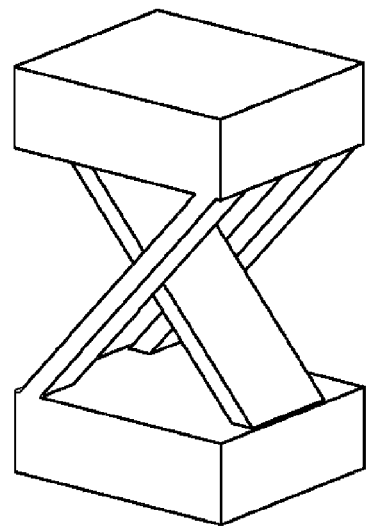
Figure 5C:
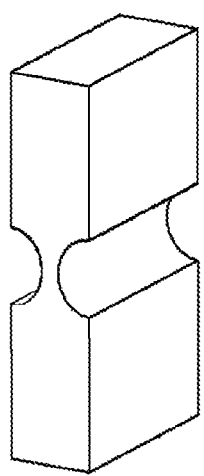
Figure 5D:
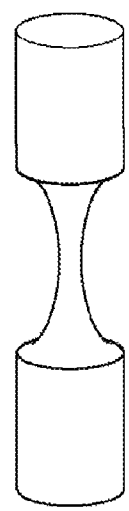

Flexures resist motion between the rigid elements that react against the wide or stiff cross sectional direction and allow movement when a force reacts against the flexures thin or weak direction. Flexures commonly define a relative pivot axis about which the flexure bends. Beam flexures, like the ones illustrated in FIGS. 5A and 5B, are thin, plate-like springs, which, depending on the mounting orientation, can either rotate or translate.

A flexure may be machined from the same material as its attached rigid member or may be a separate piece attached to the rigid elements. In embodiments, flexures and rigid elements may be manufactured or formed from a single, monolithic, integral, or homogeneous piece of material. Typically, that material will be a metal. Aluminum, steels, and other more exotic metals may serve this function.

In contrast to flexures, a rigid element or member is a comparatively rigid segment. For an individual flexure or rigid element, by rigid is meant that the rigid members' section modulus in each dimension is substantially greater than the minimum section modulus of a flexure that is designed to flex. In embodiments, the section modulus of a rigid element may be orders of magnitude larger than the section moduli of flexures about their bending axes. For example, a flexure that is designed or required to flex, e.g., allow its attached rigid members to move, rotate, or pivot relative to each other about the flexural joint, may need to be flexible (not rigid), and may have a section modulus orders of magnitude less than the section moduli of its attached rigid members. The less motion a flexure must bend or flex, the more rigid it can be, or the more similar its section modulus can be to a rigid element.

3. Types of Flexure Motion

Flexures may bend in various ways as a means of moving a linkage set through a range of motion. FIGS. 6A-6D illustrate various flexure motions, including rectilinear (FIGS. 6C and 6F) and rotational (FIG. 6B). In the flexure illustrations, a fixed block is shown on the top and a moving block, shown on the bottom, moves from a left-to-right or right-to-left position. In several of the illustrated movements, the moving block displaces vertically as it moves from left-to-right or right-to-left (in the figure). The linear motion illustrated in FIG. 6C does not displace vertically as it moves from one position to another.

Individual beam flexures typically do not provide the potential for linear motion unless the flexure (a) incorporates a bend or bow into the thin direction of the cross section of the flexure, (b) allows a region of the thin direction of the cross section to buckle or "oilcan", or (c) is combined into a set of flexures, as shown in FIG. 6F, where the flexible beams of all flexures are parallel. As shown in FIG. 6C, in any translation condition where a single flexure allows linear motion there is a resulting extension or compression of the flexure normal to the direction of motion. Causing a flexure to oilcan may significantly deteriorate the flexure's ability to control the direction of motion because the flexure must form multiple inverse bends.

One way of moving a carriage in relations to a fixed base is through rectilinear motion. Rectilinear motion is linear motion produced by forcing one rigid element to move or translate in relation to another rigid element by deforming or flexing the flexure opposed to just bending the flexure between the rigid elements. FIG. 6C illustrates the rectilinear motion of one rigid element with respect to another rigid element; the flexure between the two rigid elements deforms or flexes as opposed to simply bending.

FIG. 6E illustrates plan and isometric views of a fine-positioning notch flexure in a two-dimensional linkage (the linkages are 180 degrees opposed) that simply bends the flexures between a fixed base and a moving carriage to produce rectilinear motion of the moving carriage. FIG. 6F illustrates plan and isometric views of a fine-positioning blade flexure that produces rectilinear motion in a two-dimensional linkage to translate a moving carriage relative to a fixed base by deforming or flexing the blade flexures between the fixed base and the moving carriage. Typically flexures are combined serially in pairs and attached as opposing sets at the carriage corners to the base. In the illustrated arrangements, all beam flexures are parallel to each other.

The two fine-positioning blade flexures illustrated in FIGS. 6E and 6F include flexures that are arranged in a two-dimensional symmetrical arrangement. The arrangement is symmetrical because in one plane, one side of the arrangement mirrors the other.

V. Design Limitations of Straight-Line Mechanisms

The inventors of embodiments of the present disclosure have identified that existing linkages, when used for translating motion in a linear stage, include some design limitations. If not compensated for, these design limitations can disadvantageously produce parasitic or unpredictable motion that may negatively impact the performance of a linear-motion stage. These design limitations include: parasitic effects caused by hinges or bearings, non-linear motion caused by a flexure's change of force as it moves through a range of motion, negative consequences of using an assembly of parts, and non-linear motion caused by a biased center-of-gravity.

A. Hinges and Bearings

A linkage set may include hinges or bearings. Hinges and bearings can impose a change in force over their range motion due to changes in surface finish or friction between surfaces that move relative to each other. As such, there can be variation in forces against a moving stage over its travel range and a build-up of forces that may cause parasitic or non-linear motion of the moving stage.

Hinges and bearings are subject to hysteresis or non-repeatable motion because they are made of an assembly of parts that interact at their sliding surfaces. Those stresses may be created during assembly, alignment, or operation. Hysteresis may also be caused by plastic deformation of materials or changes in surface properties. For example, optical systems are often used in environments that undergo large temperature excursions. Specifically, cryogenic optics may operate at temperatures well below ambient, sometimes at only a few degrees Kelvin, from about 4 degrees Kelvin to 80 degrees Kelvin, or several hundred Kelvin. Temperature excursions can cause material shrinkage or expansion, gap or fit changes between mating components, and changes in surface friction properties. These property changes can create different hysteresis or non-repeatable motion effects with differing operating (e.g., temperature) conditions.

Meanwhile, devices must be manufactured and set up by human beings operating at standard atmospheric temperatures and pressures. At every joint, thermal stresses and unpredictable stick, slip, or both may occur due to residual stresses from fastening, thermal expansion and contraction of components, or both. Moreover, the surface finish on sliding components causes stiction and friction. Stiction is the static or threshold force that must be overcome to enable movement between two sliding surfaces.

Stiction is not predictable and may change over time. Changes in temperature during the life of an instrument often cause variations in net expansion or contraction of materials as a result of component temperature differences, material property differences, e.g., different coefficients of thermal expansion, and usually both. Accordingly, over time, and over temperature, various additional stresses may be induced, relieved, or both. Thus, variation in temperature may cause a change in stiction. That variation in stiction can disadvantageously impact the performance of linear stage as the linear motion of the moving stage can be unpredictable or "jerky".

For example, in the case of an interferometer, a linear-motion stage attempts to move the carriage at constant velocity or acceleration through its range of motion. Stiction can create unpredictable moving mirror velocity or acceleration changes. As described above with regards to a Michelson interferometer, a Fourier transform may be used to transform the interferogram's signal in the time domain to a frequency domain. If a moving mirror's velocity is unpredictable or jerky, the time domain may not translate well to the frequency domain, which may create noise or errors in spectrum measurements.

B. A Flexure's Change in Force Over its Range of Motion

Flexures may be used between linkages to provide the range of motion in a linkage set in a linear-motion stage. A flexure has a spring constant that generates a force when the flexure is not in its neutral position. The spring force changes as a flexure moves through its range of motion. The spring-force change primarily applies to the moving linkage's direction of travel. For example, a slight bend in a flexure that produces only a small movement of an attached linkage (or rigid member) requires only a small force. In contrast, a large bend or movement that produces a large movement of an attached linkage can require a large force.

The spring-force change also applies to directions other than the direction of travel. Also, the difference in force, e.g., pushing or pulling, in a direction other than the direction of travel, as a flexure moves between a small bend and a large bend, may not be linear. This change in force or variation can induce non-linear motion or shear. For example, referring back to FIGS. 6A-6D, as the moving block in each illustration moves from left-to-right or right-to-left, the flexure connecting the fixed block to the moving block exerts a positive or negative vertical (as oriented in the illustration) force on the moving block with respect to the fixed block. This force may cause the moving block to displace vertically, or in a non-linear or shear motion, through the flexure's range of motion. The moving block may displace vertically unless other forces are applied to the moving block to hold or constrain the moving block's vertical displacement. Within the linear stage of an interferometer, the non-linear motion can cause an angular deviation (tilt) or lateral displacement (shear) of a reflected beam from a moving carriage. The angular deviation or lateral displacement of a reflected beam can degrade an interferometer's performance.

Also in an interferometer, a drive or motor typically provides the force that moves the carriage in relation to the base. Ideally, in some applications such as an interferometer, a linear-motion stage attempts to move the carriage at a constant velocity or acceleration through its range of motion. Because a flexure changes in force over its range of motion, and that force change may be non-linear, a drive or motor may not be able to fully compensate for the non-linear forces acting on the carriage through its range of motion. Thus, the carriage may accelerate or decelerate unpredictably through its range of motion. In an interferometer application, the carriage's change in velocity or unpredictable velocity or acceleration can degrade the interferometer's performance.

C. An Assembly of Parts

A multiple-arm linkage used in a linear-motion stage may be made up of an assembly of parts. In an optical system, like an interferometer, each component must be positioned and aligned. Specific displacements and angles between optical elements along an optical path must typically be aligned as precisely as the requirements of the optical system. Various alignment mechanisms are used to assure alignment of the various components. Each component must be accurately positioned with respect to the intended propagation direction of electromagnetic radiation, e.g., light, at whatever frequency.

The accuracy to which optical elements are initially positioned greatly influences the quality or precision of the system. Potential position errors may be induced in an assembly of parts during assembly, alignment, adjustment, calibration, or operation of the components. The alignment process itself is meticulous as each joint that is released or decoupled from other components in order to move a component may miss-align in more than one degree of freedom. Thus, the alignment process is time consuming.

Additionally, individual parts are machined or manufactured with their respective variation and tolerances. Even the manufacturing of a single part requiring multiple machine set-ups or operations can create tolerance stack-up. Tolerance stack-up can induce parasitic motion or unpredictable velocity in the moving carriage of an interferometer.

D. Biased Center-of-Gravity

The moving carriage in linear-motion stage may have a center-of-gravity (CG) that is not centered on or at the carriage support points. In either a gravity or microgravity environment, if the CG of a moving carriage is biased towards one side, the moving carriage may move with unpredictable shear and tilt. A non-centered CG may also cause unpredictable motion due to the variation in spring-flexure force applied to the carriage as the carriage travels through its range of motion.

VI. Possible Solutions

The inventors of embodiments of the present disclosure have identified the need for a higher precision linear-motion stage. A high-precision linear-motion stage may be used to translate a mirror in an interferometer with very little shear or tilt. The inventors have further identified several disadvantages of using the above-described mechanisms for providing high-precision linear motion. The inventors have identified several possible solutions, portions of which may be combined, to overcome the design limitations described above. These solutions include: angular symmetry or asymmetry, radial symmetry or asymmetry, a monolithic design, or combinations thereof.

A. An Angularly Symmetric or Asymmetric Linkage

Figure 7A:
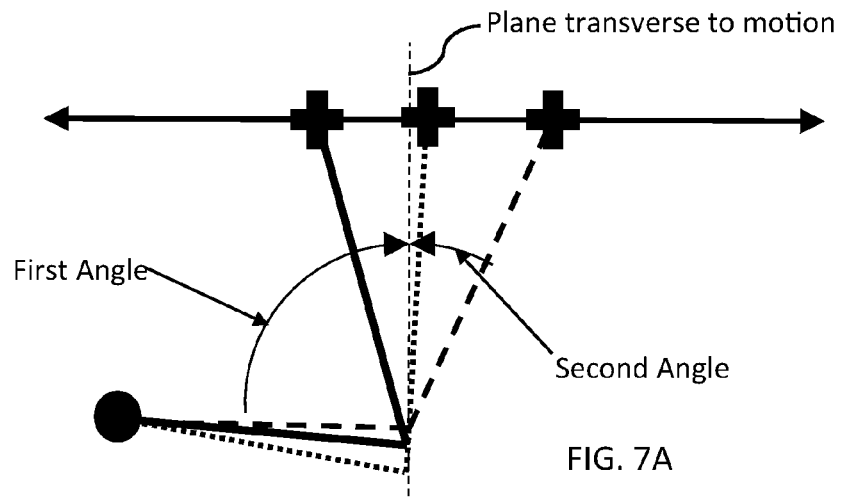
FIG. 7A illustrates the motion of one double-arm linkage that is angularly asymmetrical.
Figure 7B:
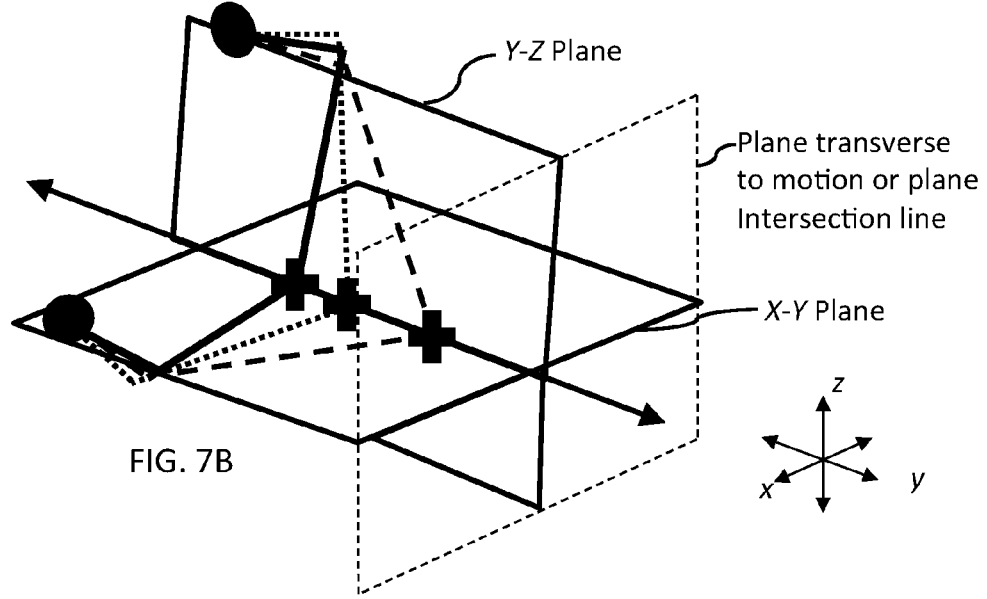
FIG. 7B illustrates two double-arm linkages that are angularly and radially asymmetrical—the double-arm linkages are orthogonal to each other.
Figure 7C:
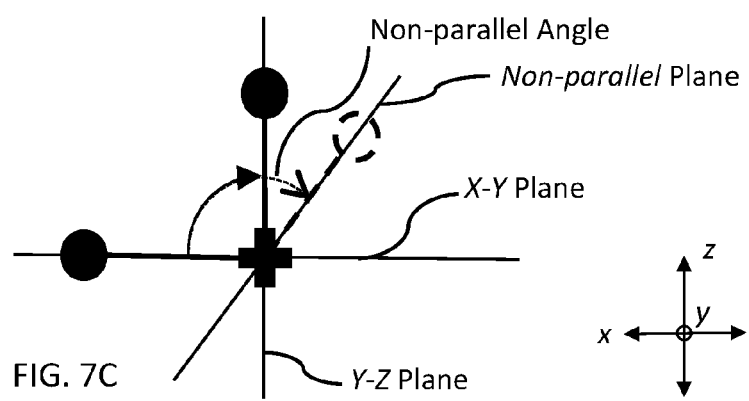
FIG. 7C illustrates an end view of two double-arm linkages that are angularly and radially asymmetrical—the double-arm linkages are non-parallel to each other.

A linkage set used in a linear-motion stage may be arranged angularly symmetric or asymmetric. FIGS. 7A, 7B, and 7C illustrate a side, isometric, and end views view of angularly asymmetric double-arm linkages, respectively. Similar to FIGS. 4B and 4C, the fixed end of each double-arm linkage is illustrated with a filled-in circle or dot and the moving end is illustrated as a cross. In FIGS. 7A and 7B, the dashed lines illustrate different positions of the double-arm linkages with the moving end extended to different positions. The arrangements illustrated in the FIGS. 7A, and 7B are angularly asymmetric because the angle formed between a first rigid element and the plane transverse to the travel direction is not equal to the angle formed between a second rigid element and the plane transverse to the travel direction. In other words, the "First Angle" is not equal to the "Second Angle" throughout the linkages' range of motion. This is also true for multiple-arm linkages containing more than two rigid elements if the angles between at least two of the rigid elements and the plane transverse to the travel direction are not equal through the linkages' range of motion.

The double-arm linkage set in FIG. 7A and linkage sets in FIG. 7B are also angularly asymmetric because the fixed point, illustrated as a filled-in circle or dot, of the first arm does not lie along the linear motion path of the moving end of the second arm. This is also true for FIG. 7C but is not shown because of the end-view viewing angel. The double arm-linkage set embodiment illustrated in FIG. 7B is also angularly asymmetric because the arms or rigid elements within each linkage set are a different length. A multiple-arm linkage will be angularly asymmetric if the attachment point of one arm to a base (e.g., the "dot" in FIG. 7B) does not lie along the linear motion path of the moving end of the second arm or the arms are different lengths. Also, a multiple-arm linkage with an odd number of arms will also be angularly asymmetric. The angularly asymmetric linkage set in FIG. 7B, with unequal arm lengths in each double-arm linkage, is different than the Sarrus linkage illustrated in FIG. 4C, which has equal arm lengths.

The example double-arm linkages in FIG. 7B are arranged orthogonal to each other. One double-arm linkage constrains motion of the moving cross in X-Y plane and the other double-arm linkage constrains motion of the moving cross in the Y-Z plane. The X-Y plane and the Y-Z plane intersect along the y-axis. Combined, the two double-arm linkages constrain motion of the cross along a line illustrated as parallel to the y-axis.

A linkage assembly manufactured with flexures may have some operational disadvantages that, if not compensated for through other design elements of the linkages, can disadvantageously produce parasitic or unpredictable motion that may negatively impact the performance of a linear-motion stage. For example, if a linkage assembly is manufactured using flexures, the flexures' arrangement can cause non-linear motion due to lateral forces (e.g., a force component perpendicular to the travel direction) exerted by the flexures on the moving stage through the flexures' range of motion.

B. A Radially Asymmetric Arrangement

A linkage set used in a linear-motion stage may be arranged radially symmetric or asymmetric. The linkage sets in FIG. 7B are arranged radially asymmetric about the travel direction. The linkage set in FIG. 7B includes a double-arm linkage that extends in the positive (shown extending up) Y-Z plane and another double-arm linkage that extends in the positive (shown extending out of the page) X-Y plane. The linkage set in FIG. 7B is radially asymmetric because there are not corresponding double-arm linkages extending in the negative Y-Z and X-Y planes.

Radially asymmetric double-arm linkages like those illustrated in FIG. 7B can be, but need not be, arranged orthogonal relative to each other to constrain motion of a moving carriage along a line. For example, FIG. 7C illustrates an end view of two double-arm linkages arranged non-parallel relative to each other. In FIG. 7C, the dashed line illustrates different possible radial asymmetric positions of one double-arm linkage with respect to the other double-arm linkage. One double-arm linkage set is illustrated as being in the X-Y plane and constrains motion of the cross to movement in the X-Y plane. The other double-arm linkage set is illustrated as being in a plane that is non-parallel to the X-Y plane but parallel to the y-axis. The other double-arm linkage set constrains motion of the cross to the non-parallel plane. Together, the two double-arm linkages constrain motion of the cross to a line, illustrated in this example as they-axis.

In FIG. 7C, the angle between two double-arm linkages is greater than zero and less than 180 degrees (e.g., non-parallel), and is sufficiently non-parallel to constrain motion of the cross to a line. The angle between two double-arm linkages need only be sufficiently non-parallel to constrain motion of a moving carriage to a line. For example, the angle between the two double-arm linkages can be any angle that is not zero and not 180 degrees to constrain motion of a moving carriage to a line, depending on other design elements of the double-arm linkages.

As described above, a flexure's force, acting both along the direction of travel and in other directions, e.g., lateral directions, changes through the double-arm linkage's or moving carriage's range of motion. These changes in lateral force can create non-linear motion or shear and tilt in a radially asymmetric configuration because symmetrically opposing linkages are not available to counteract the changes in force through the flexures' range of motion.

However, the inventors of the present disclosure have discovered that for a radially asymmetric arrangement, lateral forces acting on the carriage can be compensated for by providing: (a) linkage arms of different lengths, e.g., angular asymmetry, (b) a fixed end that does not lie along the linear motion path (or line) of the moving end (also angular asymmetry), (c) different angles between the arms of a linkage (also angular asymmetry), (d) varying the spring constants or spring rates of the flexures themselves, or (e) varying the initial angles between the linkage arms at the neutral position (also angular asymmetry). Any of these arrangements or design options may be used, alone or in combination, to compensate for changes in lateral (e.g., perpendicular) forces over the travel range such that the resulting motion of a moving stage relative to the base can be linear and predictable. When using flexures, lateral-force compensation ensures, and is usually necessary, for a linear-stage design to move in a linear motion. The changes in lateral forces are likely the reason why a radially asymmetric Sarrus linkage, used as a linear motion stage or precision linear actuation, has not previously incorporated flexures in its design.

C. A Radially Symmetric Arrangement

A radially symmetric design can have several advantages. First, because the arrangement is symmetrical, the rigid segment and flexure linkage sets cancel forces that lead to parasitic motion. FIGS. 8A, 8B, and 8C illustrate end, side, and isometric view, respectively, of a three-arm radially symmetric linear-motion stage 300. FIGS. 9A, 9B, and 9C illustrate an end, side, and isometric view, respectively, of a four-arm radially symmetric monolithic linear-motion stage 400.

Radially symmetric configurations with opposing linkage sets or opposing flexure arrangements like those illustrated in FIGS. 8A-9C may include flexures that change in force through their range of motion. Each flexure in the fine-positioning linear stages induces a change in force that is applied to the moving carriage over its range of motion. That force is directed along the line of motion and in other directions not along the line of motion, e.g., perpendicular to the line of motion. Those forces can cause non-linear motion or shear of the moving carriage. The radially symmetric arrangement works well because the change in force from one flexure cancels the change in force of its opposing flexure or flexures. The resulting motion of the stage relative to the base can therefore be linear and predictable.

However, a radially symmetrical arrangement also has some disadvantages. First, it may be difficult to manufacture a three-dimensional, radially symmetric linkage that is monolithically and homogenously formed from a single material. Additionally, the radially symmetric arrangement may occupy a larger volume and have a greater weight as compared to a radially asymmetric arrangement. Several of these disadvantages may be overcome by using angular asymmetric linkage sets as described above.

D. An Assembly of Parts or a Monolithic Arrangement

A linkage assembly of parts has some assembly and operational disadvantages. An assembly of parts includes multiple parts, i.e., more parts to manufacture and more tolerance stacking. An assembly of parts can also be difficult to assemble and mechanically or optically align. A linkage assembly made of hinges or bearings also comes with its associated problems of hysteresis, friction, or stiction, each of which produces non-repeatable motion.

A linkage set used in an interferometer may be monolithically and homogeneously formed of a single material. The linkage set may include rigid segments that are effectively blocks connected in series by flexures, the flexures and the rigid segments being formed from a single material. In this configuration, no joints are used between the rigid elements and the flexures. An advantage of monolithic manufacturing is that flexures, a linkage set, or multiple linkages can be manufactured in a single operation to significantly reduce or eliminate tolerance stack-up, alignment error, and assembly and alignment steps and time.

VII. Examples

The following examples are illustrative only and are not intended to limit the disclosure in any way.

A. A Linear-Motion Stage with Four Multiple-Arm Linkages

1. Application and General Description

Figure 10A:
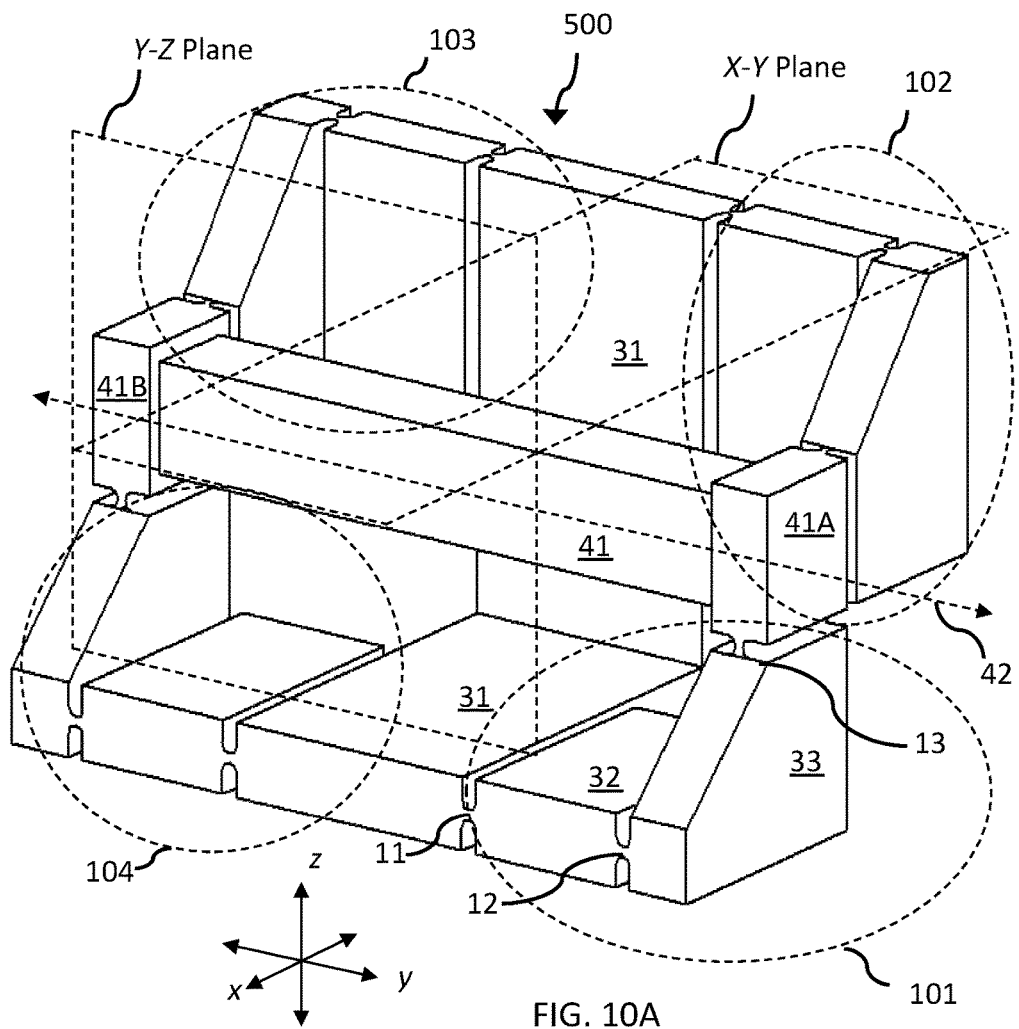
FIG. 10A illustrates an example angularly and radially asymmetrical linear-motion stage with four multiple-arm linkages.

FIG. 10A illustrates in an isometric view an embodiment of a radially and angularly non-symmetric, multiple-arm linear-motion stage 500 with four multiple-arm linkages, labeled 101-104, which are circled. In embodiments, a linear-motion stage 500 may include a base 31, a carriage 41, a first carriage end 41A, a second carriage end 41B, and two or more multiple-arm linkages.

The linear-motion stage 500 may be used in various linear-motion stage applications. Any device may be attached to the carriage of a linear-motion stage. For example, linear-motion stage 500 may be used in manufacturing equipment or machines including robots, machine tools, assembly, semiconductor equipment, laser equipment, electronic manufacturing equipment, or other industrial automation applications. Linear-motion stage 500 may also be used in a variety of optical applications, including a microscopic stage, an optic lab stage, an optical fiber alignment system, or as an optical stage or as an interferometer mirror translation stage in a Fourier transform spectrometer.

Referring back to FIGS. 1A and 2A, the linear-motion stage 500 may be used to provide the mirror displacement of a corner-cube reflector 60 or a planar mirror in a Fourier transform interferometer 50. A corner-cube reflector or planar mirror may be attached to the carriage 41 or the first or second carriage ends 41A or 41B. Alternatively, any optical device may be attached to the carriage 41 or the first or second carriage ends 41A or 41B to provide linear motion to the optical device. For example, an optical device may be a lens, filter, diffuser, beamsplitter, focal plane array, prism, polarizer, grating, light source, collimator, or other optical device.

In embodiments, the linear-motion stage 500 may provide a true linear mirror displacement (low shear and low tilt) for the corner cube reflector 60 or planar mirror in a Fourier transform interferometer 50. The base 31 may be fixed relative to other components of the interferometer 50. The carriage 41, or carriage ends 41A or 41B, may oscillate in a back and forth motion, as illustrated by the Carriage Motion line, relative to the base 31 and other components of the interferometer 50. The carriage 41, or carriage ends 41A or 41B, may move back and forth, like an oscillating spring, in a fluid, predictable motion with little to no friction.

The linear-motion stage 500 is arranged radially asymmetric and therefore is less voluminous and weighs less than a radially symmetric linear-motion stage. In the illustrated embodiment, the carriage motion line 42 may be considered to run along the y-axis. In this arrangement, multiple-arm linkages 102 and 103 extend in the positive X-Y plane (into the page) and multiple-arm linkages 101 and 104 extend towards the negative Y-Z plane (downward). In this embodiment, the radially asymmetric, linear-motion stage 500 does not include four additional multiple-arm linkages that extend in the negative X-Y plane (out of the page) or in the positive Y-Z plane (upward).

In multiple-arm linkage 101, the first rigid element 32 originates at the base 31 via flexural joint 11. Rigid element 32 does not originate at a point along the carriage motion line 42. This is similar to the arrangement illustrated in FIGS. 7A and 7B. As a result, an angle formed between a first rigid element 32 of multiple-arm linkage 101 and a plane transverse to the carriage motion line 42, e.g., the X-Z plane, is not equal, throughout the range of motion of multiple-arm linkage 101, to an angle formed between a second rigid element 33 of multiple-arm linkage 101 and the plane transverse to the carriage motion line 42. The differing angles may be used to compensate for changes in force over the range of motion resulting in motion that is linear.

2. Multiple-Arm Linkages

Figure 10B:
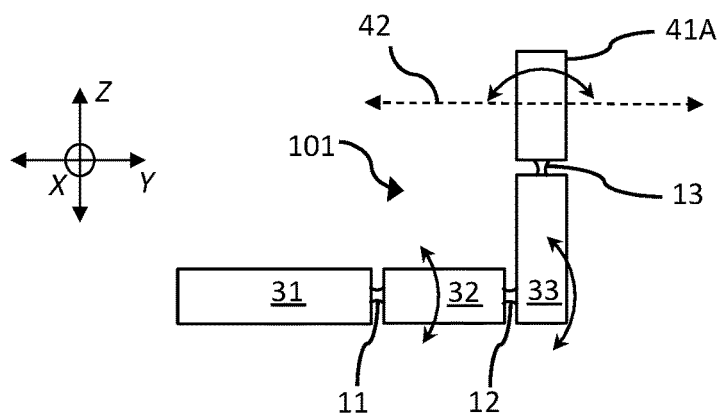
FIG. 10B illustrates an elevation view of an example multiple-arm linkage used in the linear-motion stage of FIG. 10A.

FIG. 10B illustrates an elevation view of one embodiment of a multiple-arm linkage 101, also circled in the lower-right corner of the linear-motion stage 500 in FIG. 10A. In embodiments, a multiple-arm linkage includes three flexures or flexural joints, labeled 11, 12, and 13, and two rigid members, labeled 32 and 33. The flexures and the rigid elements may be attached in series. For example, a first flexure 11 may connect the base 31 to the rigid element 32; a second flexure 12 may connect rigid element 32 to rigid element 33; and a third flexure 13 may connect rigid element 33 to carriage 41 or carriage end 41A. Components of the multiple-arm linkage 101, including the base 31 or the carriage end 41A, may be homogeneously formed of a single material, having a joint-free continuity of the single material from the base 31, through the first flexure 11, rigid element 32, second flexure 12, rigid element 33, and third flexure 13, to carriage attachment piece 41A.

3. Flexures and Degrees of Freedom

Flexures or flexural joints like 11, 12, or 13 allow their attached rigid members to move, rotate, or pivot relative to each other about the flexural joint, or about a flexural axis formed by and running the length of the flexural joint, with little to no friction. The flexures may be sufficiently long to constrain the motion of their attached rigid members to a rotating or pivoting motion, or one degree-of-freedom (DOF), about the flexural axis and constrain or prevent rotation or movement in other degrees-of-freedom. For example, referring again to FIG. 10B, flexural joint 11 forms a flexural axis, illustrated as being parallel to the x-axis, which is along the length of the flexural joint 11, that permits rigid element 32 to rotate or pivot about flexural joint 11 relative to base 32 in the Y-Z plane in a one-DOF motion. Additionally, flexural joint 11 restrains or prevents the motion of rigid element 32 in other degrees-of-freedom. Similar to flexural joint 11, flexural joints 12 and 13 allow rigid element 33 and carriage end 41A to pivot about rigid elements 32 and 33, respectively, in the Y-Z plane. For multiple-arm linkage 101, the Y-Z plane is the movement plane and all other planes are motion-constrained planes.

FIG. 10B illustrates multiple-arm linkage 101 in an unconstrained position. Flexures 11, 12 and 13, like unloaded springs, tend to hold rigid elements 32 and 33, or the multiple-arm linkage 101 in the illustrated position. To illustrate how a single flexure operates, for example, if a one-time or repetitive force is applied to carriage end or optics mounting plane 41A, and rigid element 33 is held in a fixed position, carriage end 41A will oscillate with fluidic motion, like an inverted pendulum, with little to no friction, about the axis formed by flexural joint 13.

Various flexure types are available for use. For example, cross flexures such as cantilevered (single-ended) pivot bearings and double-ended pivot bearings, or non-cross flexures such as linear flexure bearings, all sold by Riverhawk Company of New York, may be used as flexures within linear-motion stage 500. Similarly, single-end or double-end bearing flexures sold from C-Flex Bearings Company of New York may also be used as flexures. In some instances, cross flexures, which have at least two thin pieces of metal extending along some length of the flexural axis and arranged in the form of a cross, provide substantial rigidity in motion-constrained planes and adequate movement in the movement axis. There are other flexure designs that may also be used.

4. Multiple-Arm Linkages and Degrees of Freedom

Referring again to FIG. 10A, the multiple-arm linkages 101-104 constrain motion of the carriage assembly (carriage 41 and carriage ends 41A and 41B), with respect to base 31, along carriage motion line 42. If a one-time or repetitive force, with a component vector parallel to carriage motion line 42, is applied to any component of the carriage assembly (carriage 41 and carriage ends 41A and 41B), the carriage assembly will oscillate left and right with respect to base 31, along the carriage motion line 42.

For example, in the illustrated embodiment, multiple-arm linkages 101 and 104 constrain the movement of carriage 41 to movement in the Y-Z plane, or three degrees of freedom: in they or z translational directions, and rotational about the x-axis. For multiple-arm linkages 101 and 104, the Y-Z plane is the movement plane and all other planes are motion-constrained planes. Additionally, in the illustrated embodiment, multiple-arm linkages 102 and 103 constrain motion of carriage 41 to movement in the X-Y plane, or three degrees of freedom: in the x or y translational directions, and rotational about the z-axis. For multiple-arm linkages 102 and 103, the X-Y plane is the movement plane and all other planes are motion-constrained planes.

In the illustrated embodiment, the Y-Z and X-Y planes intersect at a line. That intersection line is the carriage motion line 42 or a line parallel to the carriage motion line 42. In other words, the carriage motion line 42 is parallel to an intersection line formed by the intersection of the Y-Z and X-Y plane. In the illustrated embodiment of FIG. 10A, the intersection line of the Y-Z plane and the X-Y plane is the carriage motion line 42.

When multiple-arm linkages 101-104 are combined, as in the illustrated embodiment, the linkage sets 101-104 constrain motion of the carriage 41 to movement along the carriage motion line 42, or a line parallel to the carriage motion line 42. All other lines, or lines in other directions, are motion-constrained lines. In embodiments, the carriage motion line 42 is a true linear travel path or a straight line.

In this embodiment, the motion of carriage end 41A (or 41B), where a mirror may be attached, is constrained in five degrees (three rotational, and two translational) of motion, and only free to move in one translational direction, illustrated as the y-axis direction. In embodiments, the inventors of the present disclosure have modeled a prototype carriage assembly that is able to travel along a linear path of approximate two centimeters with a tilt of less than one arc second and a shear less than one micron.

5. Over-Constrained Motion

Figure 2A:
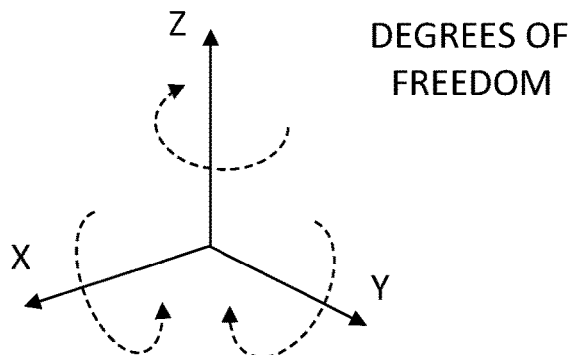
FIG. 2A illustrates an example Cartesian coordinate system.
Figure 2B:
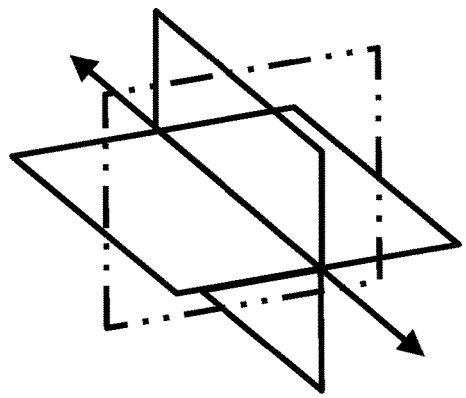
FIG. 2B illustrates motion constrained to a line.
Figure 2C:
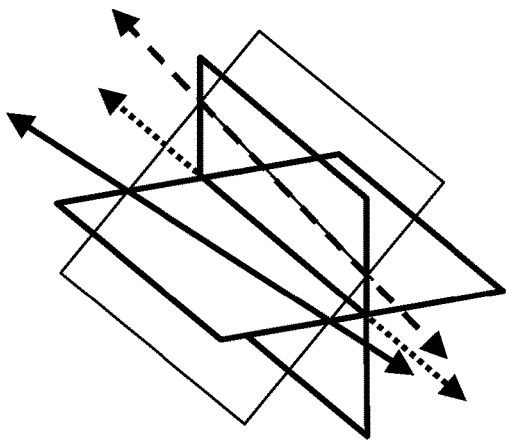
FIG. 2C illustrates over-constrained linear motion.
Figure 3A:
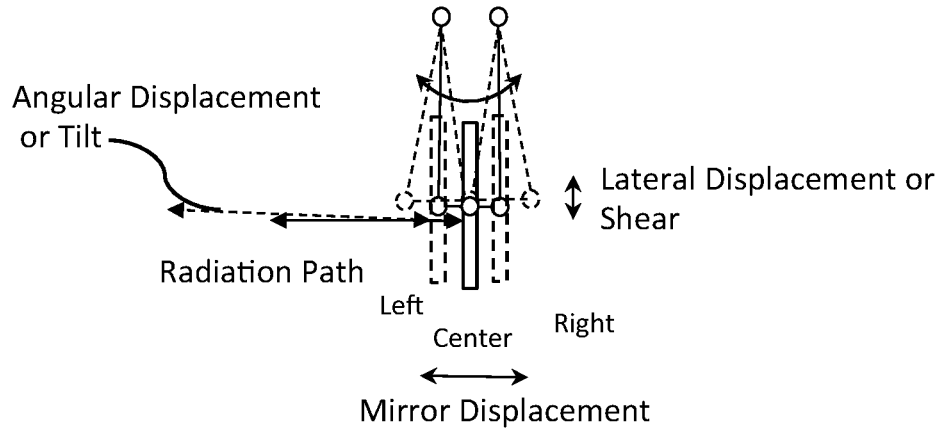
FIG. 3A illustrates a porch swing carriage with a planar mirror.
Figure 3B:
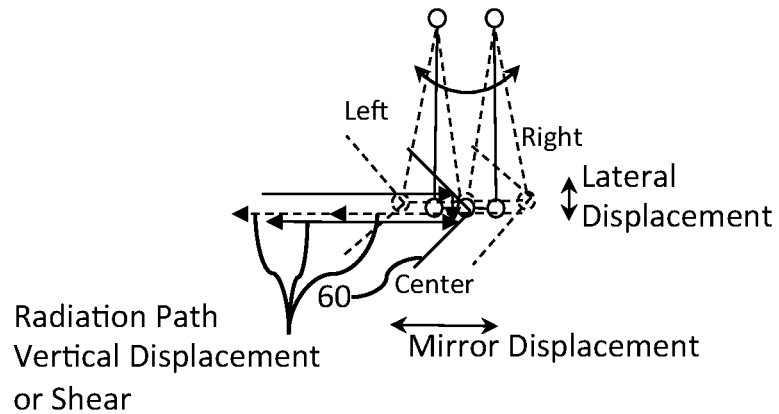
FIG. 3B illustrates a porch swing carriage with a corner cube reflector.

Each double-arm linkage set provides its own movement plane. For example, double-arm linkage set 101 provides a first movement plane, double-arm linkage set 102 provides a second movement plane, double-arm linkage set 103 provides a third movement plane, and double-arm linkage set 104 provides a fourth movement plane. In this arrangement, the first and second movement planes are perpendicular and intersect at a line. Also, the third movement plane is perpendicular to the first movement plane and parallel to, or in the same plane as, the second movement plane. If the third movement plane does not intersect the first movement plane along a line that is parallel to the intersection of the first and second movement planes, the entire mechanism may be over-constrained. FIG. 2C illustrates one possible example of the plane intersections of an over-constrained mechanism.

Described in another way, the linear-motion stage 500 may be over-constrained if the movement planes created by the linkage sets 101-104 are not parallel to a common line. If over-constrained, the motion of the carriage 41, or carriage ends 41A or 41B, may be non-linear or the carriage may move in an undefined manner or along an undetermined path. This condition may cause flexure buckling, stress and strain in the flexures, reduced life cycle, fatigue, yield, or an increase of the energy required to move the carriage 41.

The movement plane of double-arm linkage set 103 should be parallel to the movement plane of double-arm linkage set 102 and non-parallel, or preferentially perpendicular, to the movement plane of double-arm linkage set 101. If that is true, the movement plane of double-arm linkage set 103 will intersect the movement plane of double-arm linkage set 101 along a line parallel to the carriage motion line 42.

6. Avoiding Over-Constrained Motion in a Linear-Motion Stage

A linear-motion stage may be manufactured in such a way as to avoid over-constrained motion. Referring again to FIGS. 10A and 10B, in embodiments, the flexural axes or the bending axes formed by flexural elements 11, 12, and 13 within multiple-arm linkage 101 run in a parallel direction or are co-aligned to be parallel. In this sense, the flexural axes are parallel, or substantially parallel, according to achievable manufacturing tolerances associated with the machining or cutting of a multiple-arm linkage. The flexural axes formed by flexural elements within multiple-arm linkage 101 may be similarly substantially parallel to the flexural axes formed by flexural elements within multiple-arm linkage 104.

Likewise, the flexural axes within multiple-arm linkages 102 and 103 may be substantially orthogonal to the multiple-arm linkages 101 and 104. The flexural axes contained in one multiple-arm linkage may run parallel, orthogonal, or in other directions as compared to the flexural axes in other multiple-arm linkages. Typically, however, the flexural axes within a single multiple-arm linkage run substantially parallel to each other in order to constrain motion to a plane.

Single or multiple multiple-arm linkages with their respective flexures and rigid members may be manufactured through EDM (electrical discharge machining). EDM machining involves a probe electrically charged to have a potential between the mount in which a workpiece is held, and the EDM wire (or probe) that machines the work piece. By putting sufficient electrical potential between the mount (therefore the workpiece), and the probe, atoms of metal may be precisely removed from a workpiece in order to cut particular shapes.

Manufacturing the flexural axes such that they are parallel may be done in a single manufacturing operation, i.e., the workpiece is not removed from the mount throughout the entire manufacturing operation. Often, such machining is done in a submerged dielectric oil or water bath in order to provide cooling, transport of the machined material, and so forth.

B. Various Multiple-Arm Linkage Arrangements

The arrangement illustrated in FIG. 10B of flexures and rigid elements within a linkage set, including the attachment locations of flexural locations to rigid elements, is one embodiment of several possible arrangements. FIGS. 11A-11E illustrate other possible multiple-arm linkage arrangements. Other arrangements based on combinations or subsets of the arrangements illustrated in FIGS. 11A-11E are also possible. For example, in FIGS. 11A and 11B, the arrangement of rigid elements 32 and 33 in multiple arm linkage sets 201A and 201B, as well as the attachment locations of flexures 11, 12, and 13 to their respective rigid elements, have been rearranged into a "W" shape instead of a simple right-angle arrangement, as shown in FIG. 10B.

Figure 11A:
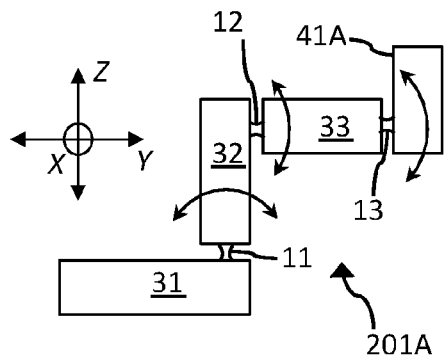
FIGS. 11A-11E illustrate elevation views of various example multiple-arm linkages.
Figure 11B:
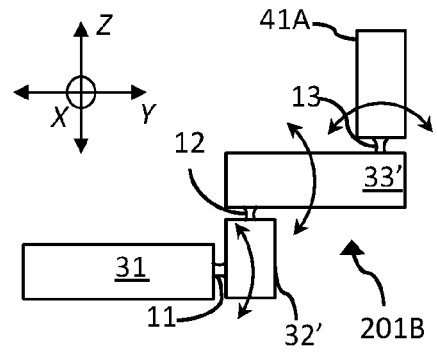
Figure 11C:
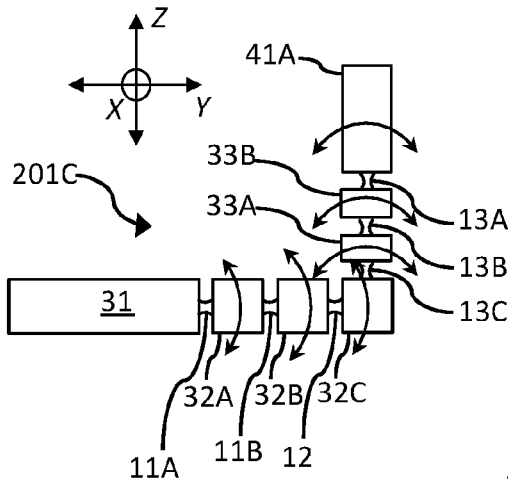

Also, for multiple-arm linkage 201C, illustrated in FIG. 11C, rigid elements 32 and 33 from FIG. 10B, have been divided into rigid elements 32A-C and 33A-B, respectively. The additional rigid elements necessitate three additional flexures such that multiple-arm linkage 201C includes six flexures: 11A, 11B, 12, 13A, 13B, and 13C. The increased number of rigid elements and flexures allows for greater travel distance of carriage attachment piece 41A in the Y-Z plane and thus a greater travel distance for an optical component attached to carriage attachment piece 41A along a line parallel to the y-axis. However, the increased number of rigid elements and flexures may decrease the rigidity of the multiple-arm linkage 201C. For a multiple-arm linkage, by rigid is meant that the linkage set's section moduli in the non-motion or motion-constrained planes is substantially greater than the linkage set's section modulus in the movement plane. In other words, by rigidity is meant the ability of the multiple-arm linkage to allow motion in the movement plane and constrain motion in other planes.

Figure 11D:
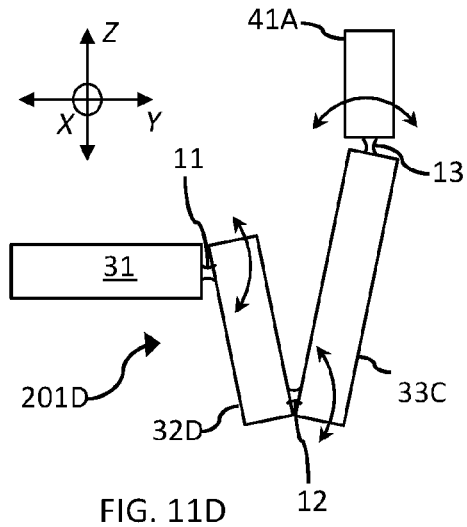
Figure 11E:
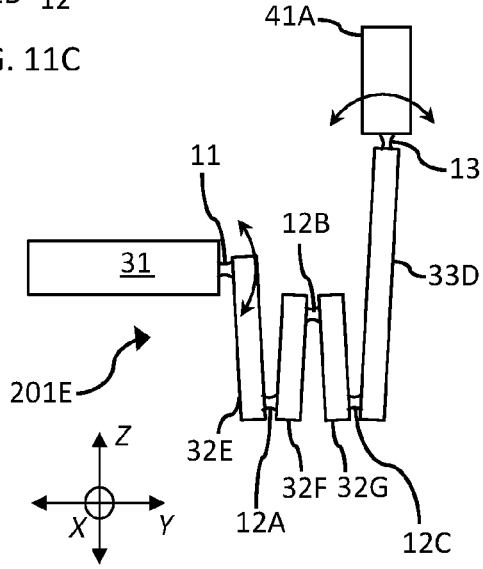

FIG. 11D illustrates multiple-arm linkage 201D, which arranges rigid elements 32D and 33C away from base 31 and then back towards carriage attachment piece 41A. In FIG. 11E, multiple-arm linkage 201E includes additional rigid elements 32E-G and flexures 12A-12C, arranged in an accordion-like shape. Like the other multiple-arm linkages with additional rigid members and flexures, multiple-arm linkage 201E provides greater mobility in the Y-Z plane and thus greater travel distance for an optical component attached to carriage attachment piece 41A along a line parallel to the y-axis. However, multiple-arm linkage 201E may also have decreased rigidity if greater optical travel distance is required.

The section modulus of any flexure within a multiple-arm linkage illustrated in FIG. 10B or 11A-11E need not be the same as the section moduli of any other flexures in the same multiple-arm linkage. If the section modulus of the first flexure is greater than the section modulus of other flexures, the entire multiple-arm linkage will be more rigid. For example, having a first flexure with an increased section modulus and having other flexures in the same multiple-arm linkage with decreased section moduli in their bending directions may provide a multiple-arm linkage that is rigid but is also capable of greater travel in the multiple-arm linkage's movement plane.

The rigid elements 32 and 33 of multiple-arm linkage 201A and rigid elements 32' and 33' of multiple-arm linkage 201B are arranged orthogonally relative to each other. Rigid elements 32 and 33 are somewhat similar in length to each other, however rigid elements 32' and 33' are not similar in length to each other. The more orthogonal a first (32 or 32') and second (33 or 33') arm of a linkage, the less similar in length they need to be. Rigid element 33' may be greater than 25% longer than rigid element 32'. In contrast, rigid elements 32D and 33C of multiple-arm linkage 201D and rigid elements 32F and 33G of multiple-arm linkage 201E are arranged nearly parallel to each other. Assuming the spacing along the Z-axis between the base 31 and the carriage 41A does not change, the more parallel the first (32D or 32F) and second (33C or 33G) arm of multiple-arm linkage, the more similar in length the arms need to be.

C. A Linear-Motion Stage with Fewer Multiple-Arm Linkages

A linear-motion stage may have fewer multiple-arm linkages than those illustrated in FIG. 10A. A linear-motion stage with two multiple-arm linkages may still constrain motion of a carriage along a true linear travel path so long as the flexures are sufficiently rigid or the multiple-arm linkage linear carriage is sufficiently balanced, e.g., there is not a biased center-of-gravity.

Figure 12A:
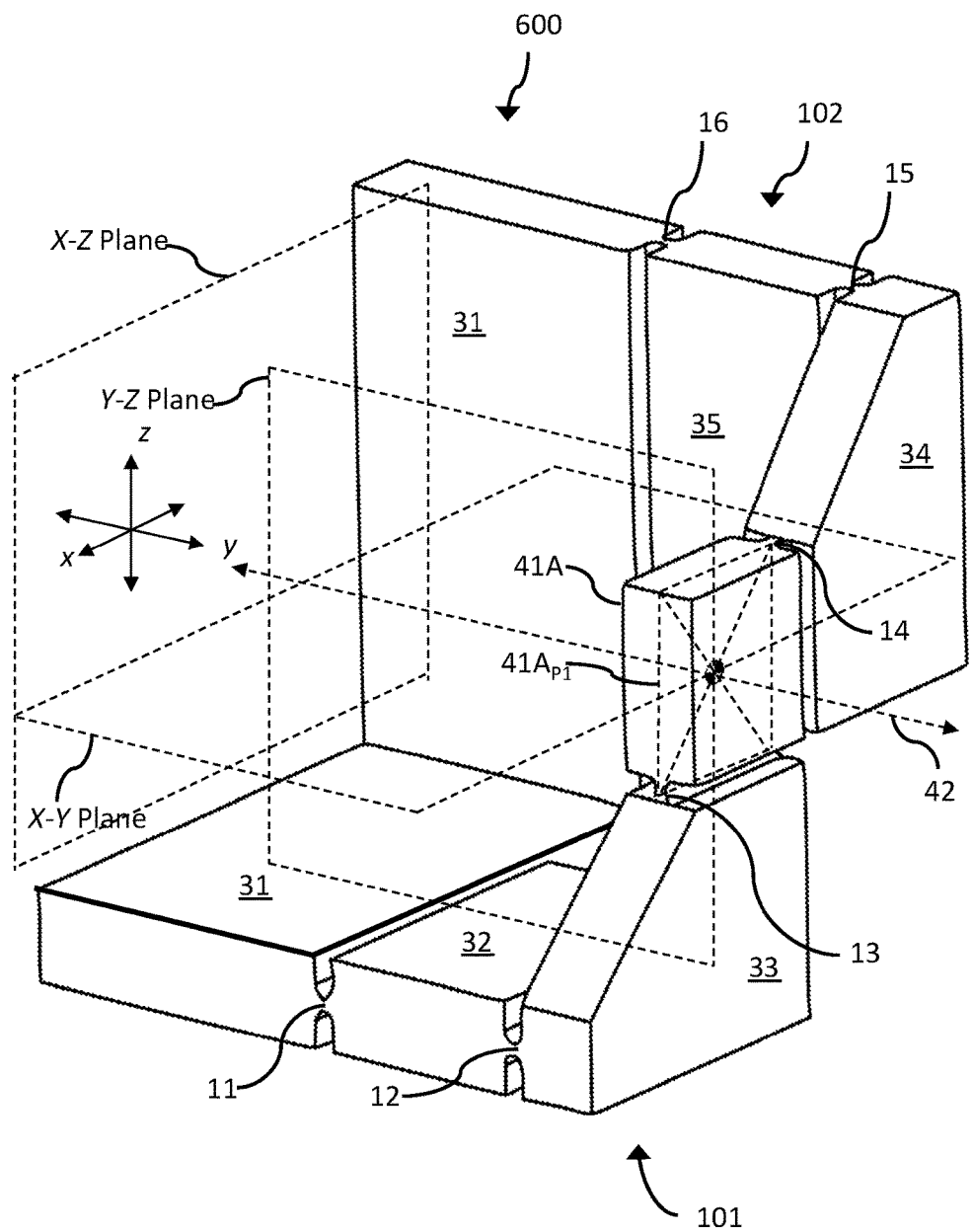
FIG. 12A illustrates an example angularly and radially asymmetrical linear-motion stage with two multiple-arm linkages.

For example, FIG. 12A illustrates a linear-motion stage 600 with a base 31, two multiple-arm linkages 101 and 102, and carriage attachment piece 41A. Base 31, multiple-arm linkages 101 and 102, and carriage attachment piece 41A are the same as those illustrated in FIG. 10A. Multiple-arm linkage 101 includes rigid elements 32 and 33 and flexures 11, 12, and 13. Multiple-arm linkage 101 constrains the motion of carriage end 41A to motion in the Y-Z plane, or a plane parallel to the Y-Z plane, because the flexural axes formed by flexures 11, 12, and 13 run parallel to each other and the x-axis (or a line parallel to the x-axis). For multiple-arm linkage 101, the Y-Z plane is the movement plane and all other planes are motion-constrained planes. Multiple-arm linkage 102 includes rigid elements 34 and 35 and flexures 14, 15, and 16. Multiple-arm linkage 102 constrains motion of carriage end or optics mounting piece 41A in the X-Y plane, or a plane parallel to the X-Y plane, because the flexural axes formed by flexures 14, 15, and 16 run parallel to each other and the z-axis (or a line parallel to the z-axis). For multiple-arm linkage 102, the X-Y plane is the movement plane and all other planes are motion-constrained planes.

In the illustrated embodiment, flexures 13 and 14, or the flexural axes (e.g., rotation axes or lines) of flexures 13 and 14, form a connection or balancing plane in the X-Z plane, labeled $41A_{P1}$. In this case, Plane $41A_{P1}$ and the surface of carriage end 41A are parallel to the X-Z plane. The center of gravity of optics mounting piece 41A is located at the center of balancing plane $41A_{P1}$. In this sense, carriage mounting piece 41A is balanced at the center of its attached flexures 13 and 14. Because the center of gravity of carriage mounting piece 41A is balanced, the flexures within multiple-arm linkages 101 and 102 are very likely to be sufficiently rigid to constrain motion of carriage mounting piece 41A along a line parallel to the intersection of the Y-Z and X-Y plane, illustrated as the carriage motion line 42. As the carriage motion line 42 is a straight line, there is no lateral displacement, shear, or tilt of the carriage attachment piece 41A as it travels along the carriage motion line 42. Therefore a mirror attached to carriage mounting piece 41A will be configured to reflect a beam with very little to no shear or tilt.

Figure 1B:
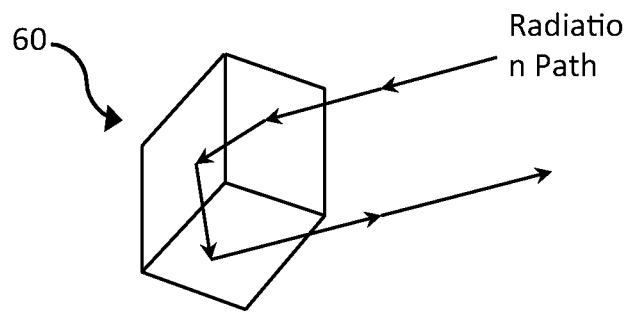
FIG. 1B illustrates a corner cube reflector.

Carriage attachment piece 41A may be configured to be balanced, even with the addition of a mirror or mirrors, e.g., planar mirror 55 or corner-cube reflector 60 illustrated in FIG. 1A or 1B, attached to carriage mounting piece 41A. If balanced, plane $41A_{P1}$ and the surface of carriage mounting piece 41A will remain parallel to the X-Z plane as carriage mounting piece 41A moves along the carriage motion line 42. If carriage attachment piece 41A is not balanced, plane $41A_{P1}$ and the surface of carriage mounting piece 41A may tilt relative to the X-Z plane as carriage mounting piece 41A moves along the carriage motion line 42.

Figure 12B:
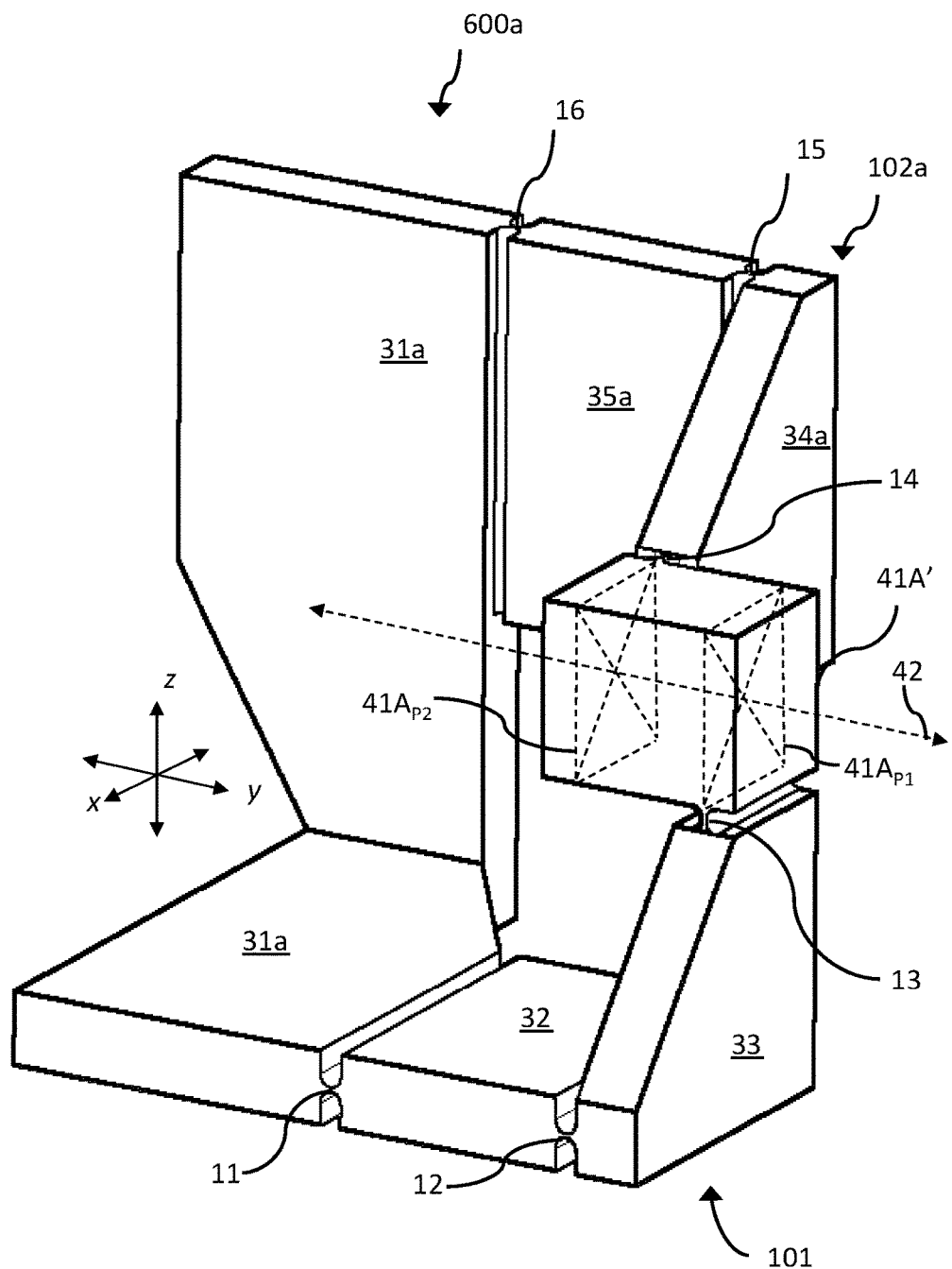
FIG. 12B illustrates another example angularly and radially asymmetrical linear-motion stage with two multiple-arm linkages attached to the carriage end at two different planes orthogonal to the carriage motion line.

Multiple-arm linkages need not attach to a carriage mounting piece in the same plane as illustrated in FIG. 12A. For example, FIG. 12B illustrates linear motion stage 600a with multiple-arm linkages 101 and 102a. Multiple-arm linkage 101 attaches to carriage mounting piece 41A' through flexure 13 along a line parallel to plane $41A_{P1}$, similar to linear motion stage 600 illustrated in FIG. 12A. However, multiple-arm linkage 102a attaches to carriage mounting piece 41A' through flexure 14 along a line parallel to plane $41A_{P2}$. Planes $41A_{P1}$ and $41A_{P2}$ are offset some distance from each other along carriage motion line 42.

Figure 13:
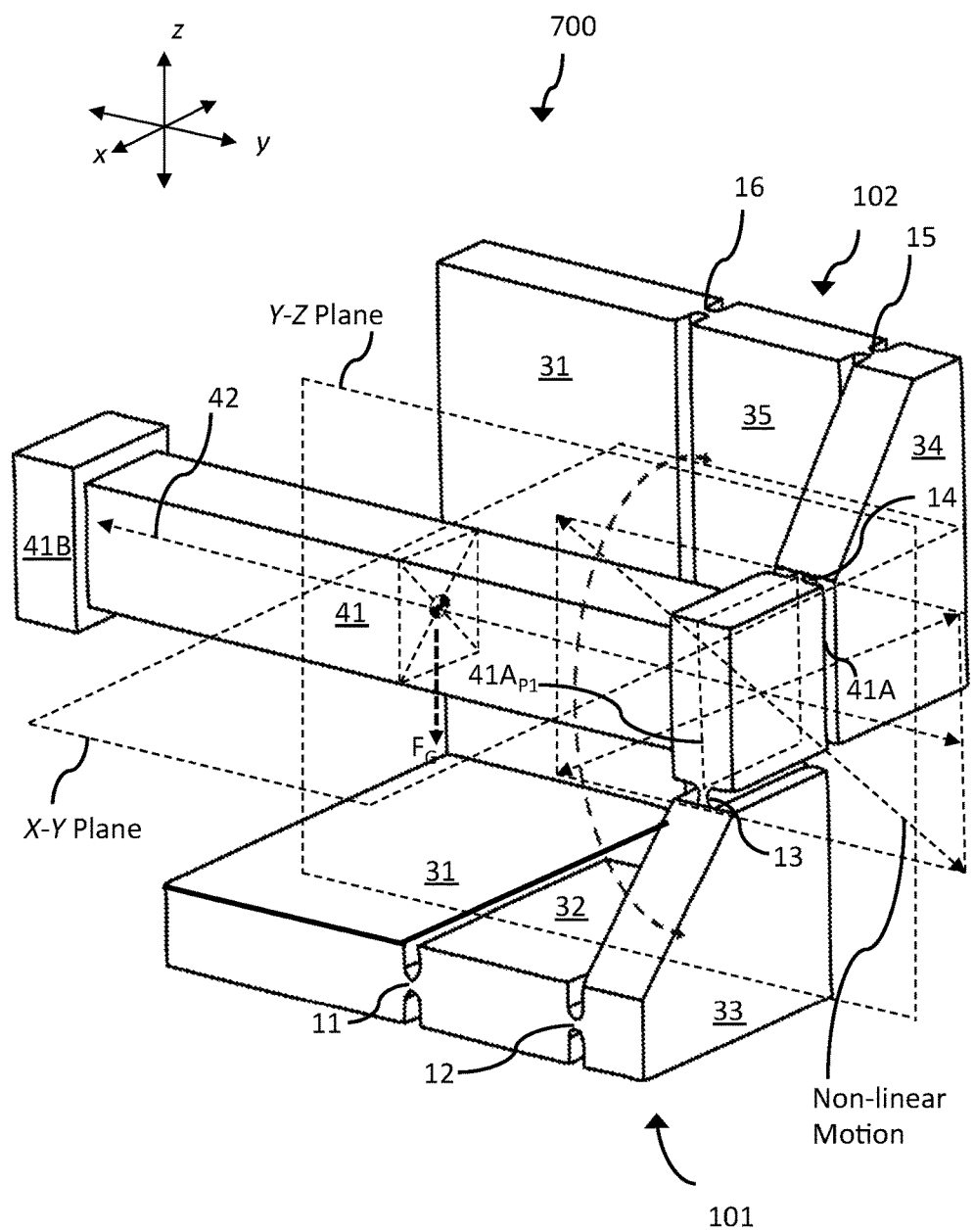
FIG. 13 illustrates an example angularly and radially asymmetrical linear-motion stage with two multiple-arm linkages and a carriage.

FIG. 13 illustrates a linear-motion stage 700 that includes the same components as linear-motion stage 600 in FIG. 12. Linear-motion stage 700 additionally includes a carriage 41 and carriage attachment piece 41B. Multiple-arm linkage 101 extends from the base 31 to first carriage attachment piece 41A; multiple-arm linkage 102 extends from first carriage attachment piece 41A to the base 31. Second carriage attachment piece 41B is offset some distance along the carriage motion line 42 from first carriage attachment piece 41A but there is no multiple-arm linkage connecting the second carriage attachment piece 41B to the base 31. In contrast to linear-motion stage 600 in FIG. 12, the center of gravity of the combined carriage 41 and carriage attachment pieces 41A and 41B in linear-motion stage 700 is displaced a distance from the carriage attachment piece or end 41A.

In a gravity or microgravity environment, the weight or gravity force of the carriage 41 and carriage end 41B (illustrated as $F_G$), or any mass not centered on balancing plane $41A_{P1}$, tends to pull the carriage 41 away from the carriage motion line 42 such that carriage 41 pivots about carriage attachment piece 41A. Under these conditions, if the flexures are not sufficiently rigid to maintain the position of the carriage 41 along a line parallel to an intersection line of the Y-Z and X-Y planes, plane $41A_{P1}$ and the surface of carriage mounting piece 41A will tilt relative to the X-Z plane as carriage mounting piece 41A moves along the carriage motion line 42. Also, the oscillating motion of the carriage attachment piece 41A may not be in a true linear path or along the illustrated carriage motion line 42.

If, however, the flexures are sufficiently rigid to maintain the position of the carriage 41 along a line parallel to an intersection line of the Y-Z and X-Y planes (e.g., the carriage motion line 42), or if a counter-balance weight is applied such that the center of gravity of the carriage assembly is balanced at balancing plane $41A_{P1}$, then the surface of carriage mounting piece 41A will remain parallel to the X-Z plane as carriage mounting piece 41A moves along the carriage motion line 42. In addition, carriage attachment piece 41A will be able to oscillate or travel along a true linear path that is parallel to a line formed by the intersection of the Y-Z and X-Y planes, or along the carriage motion line 42. Whether linear-motion stage 700 is configured to maintain little to no shear and restrict motion of its carriage 41, or first carriage end 41A, along a true linear path is a function of the rigidity of the flexures and the amount of moment-arm created by a force positioned some distance from balancing plane $41A_{P1}$. An unbalanced carriage tends to be more susceptible to vibration-induced parasitic or non-linear motion than a balanced carriage. When vibrating, the center of mass of the carriage will tend to rotate out of the constrained plane about the attachment point, or about the centroid location of multiple attachment points constraining motion to a given constraint plane.

Figure 14:
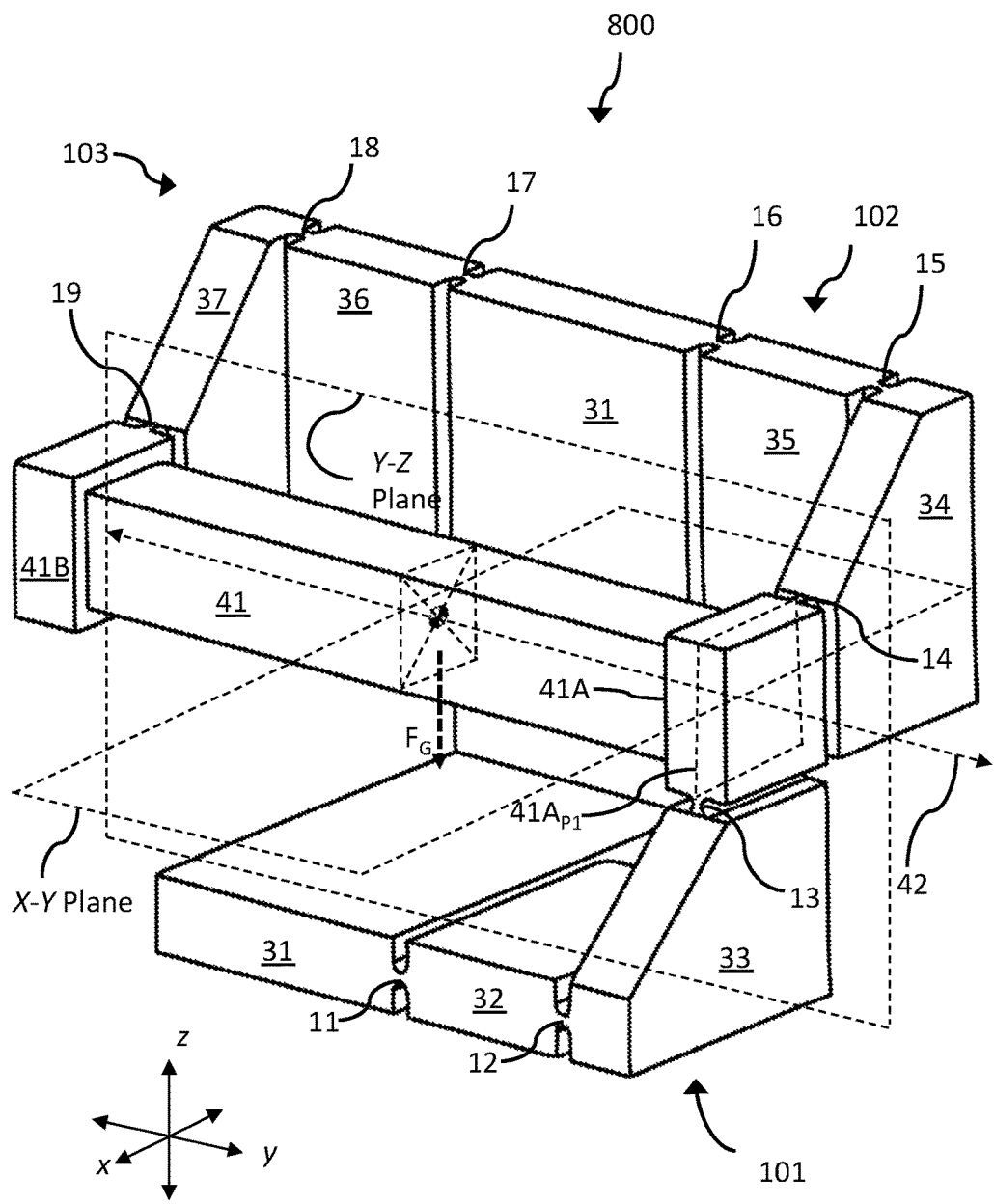
FIG. 14 illustrates an example angularly and radially asymmetrical linear-motion stage with three multiple-arm linkages and a carriage.

In some embodiments, three multiple-arm linkages may be desirable to constrain motion of a carriage along a true linear travel path. FIG. 14 illustrates an alternative arrangement of a linear-motion stage 800 that includes three multiple-arm linkages 101-103. Multiple-arm linkage 101 extends from the base 31 to first carriage end 41A; multiple-arm linkage 102 extends from first carriage end 41A to the base 31; and multiple-arm linkage 103 extends from the base 31 to second carriage end 41B. Second carriage end 41B is offset some distance along the carriage motion line 42 from first carriage end 41A.

Multiple-arm linkage 101 constrains the movement of carriage 41 and carriage ends 41A to movement in the Y-Z plane. Multiple-arm linkage 101 additionally constrains the movement of second carriage end 41B if flexural joint 13 is long. In this arrangement, the Y-Z plane is the movement plane and all other planes are motion-constrained planes. Additionally, multiple-arm linkages 102 and 103 support the mass and constrain the motion of carriage 41 to movement in the X-Y plane, i.e., the X-Y plane is the movement plane and all other planes are motion-constrained planes. Multiple-arm linkages 101-103 are sufficient to constrain motion of carriage 41 along a true linear travel path. In this embodiment, the third multiple-arm linkage, multiple-arm linkage 103, makes up for flexures that may not be sufficiently rigid so as to prevent twisting motion of carriage 41 due to the moment-arm created by the weight of carriage 41 offset some distance from balancing plane $41A_{P1}$.

Figure 15A:
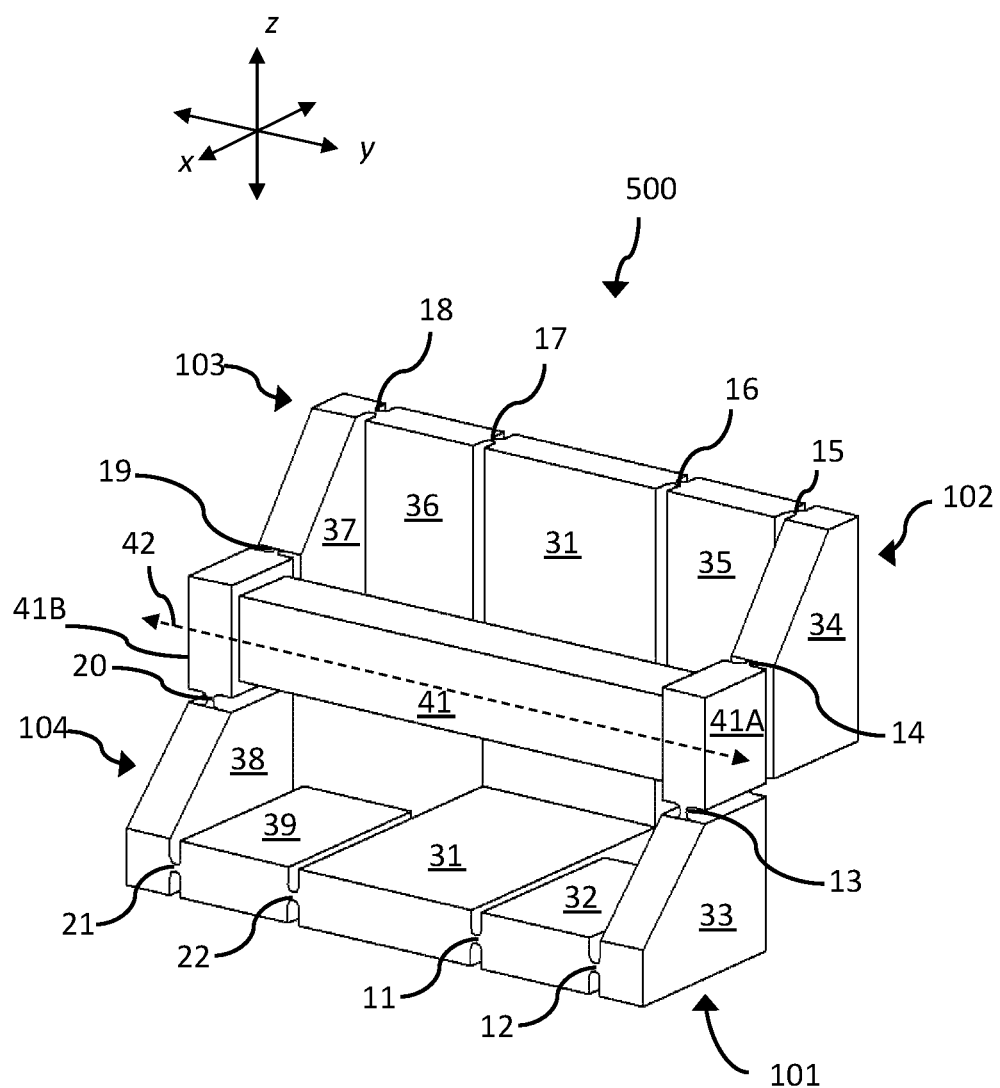
FIG. 15A illustrates an example angularly and radially asymmetrical linear-motion stage with four multiple-arm linkages and a carriage.

FIG. 15A illustrates the linear-motion stage 500 with four multiple-arm linkages 101-104, labeled with their respective rigid members and flexures. In this embodiment, multiple-arm linkage 101 connects the base 31 to first carriage end 41A and includes first flexure 11, rigid member 32, second flexure 12, rigid member 33, and third flexure 13, all connected in series. Multiple-arm linkage 102 connects first carriage end 41A to the base 31 and includes fourth flexure 14, rigid member 34, fifth flexure 15, rigid member 35, and sixth flexure 16, all connected in series. Multiple-arm linkage 103 connects the base 31 to second carriage end 41B and includes seventh flexure 17, rigid member 36, eighth flexure 18, rigid member 37, and ninth flexure 19, all connected in series. Finally, multiple-arm linkage 104 connects second carriage end 41B to the base 31 and includes tenth flexure 20, rigid member 38, eleventh flexure 21, rigid member 39, and twelfth flexure 22, all connected in series. All the components in linear-motion stage 500 may be manufactured from a single, monolithic, integral, or homogeneous piece of material.

In the illustrated embodiment of linear-motion stage 500, flexures 11-13 and 20-22 have flexural axes or the bending axes that run parallel, or substantially parallel to each other, or the x-axis. Similarly, flexures 14-19 have flexural axes that run parallel, or substantially parallel to each other or the z-axis. In FIG. 15A, the x-axis and the z-axis are orthogonal, or substantially orthogonal, so the flexural axes of flexures 11-13 and 20-22 run orthogonal to the flexural axes of flexures 14-19. In this description, "parallel" or "substantially parallel," and "orthogonal" or "substantially orthogonal" is meant that the flexural axes are manufactured parallel or orthogonal according to achievable or reasonable manufacturing tolerances.

Figure 15B:
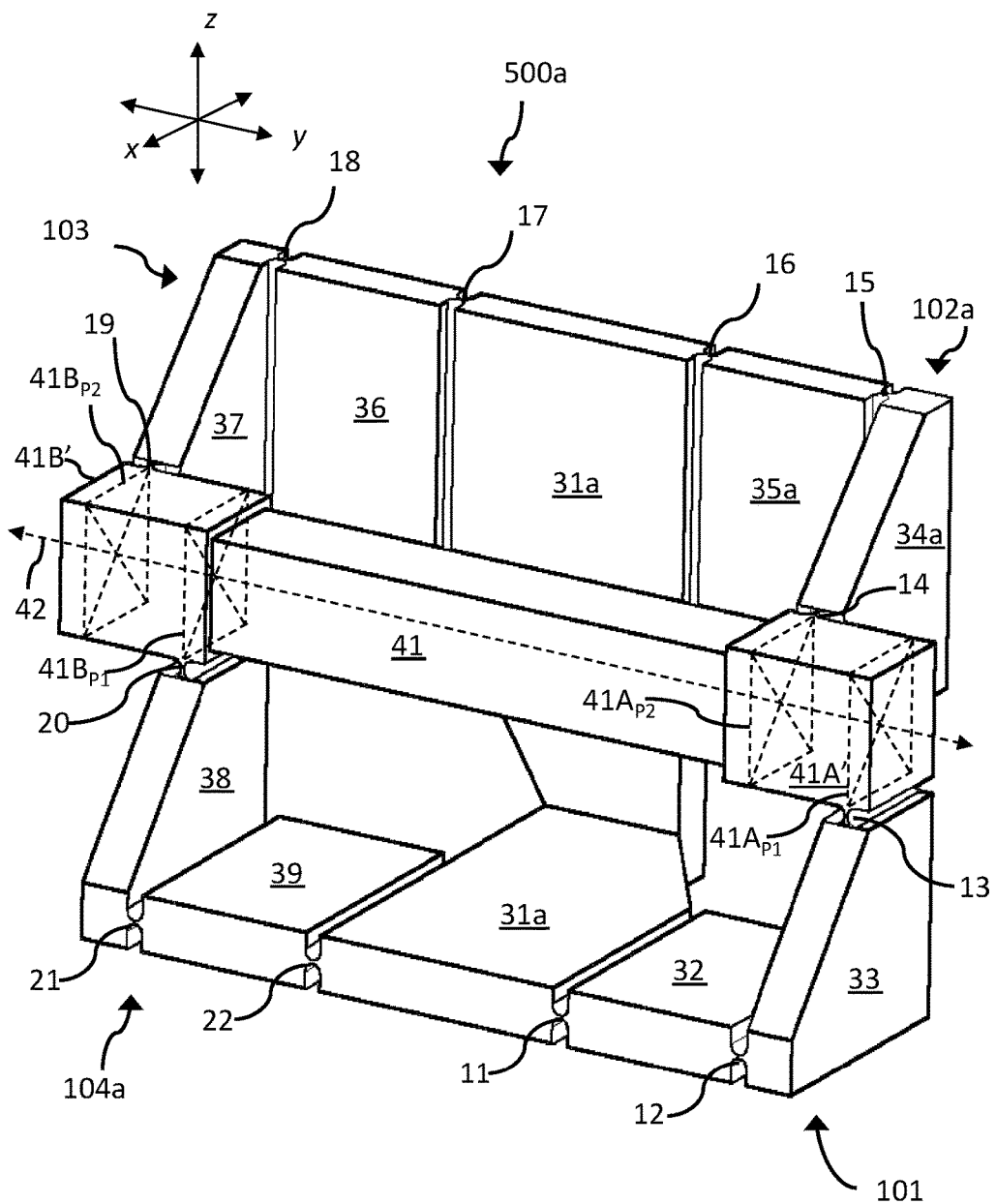
FIG. 15B illustrates another example angularly and radially asymmetrical linear-motion stage with four multiple-arm linkages attached to two ends of a carriage at four different planes orthogonal to the carriage motion line.

Multiple-arm linkages may attach to a carriage or carriage end anywhere along a line parallel to the carriage motion line. For example, FIG. 15B illustrates linear motion stage 500a with multiple-arm linkages 101, 102a, 103, and 104a. Multiple-arm linkage 101 attaches to carriage mounting piece 41A' through flexure 13 along a line parallel to plane $41A_{P1}$, similar to linear motion stage 500 illustrated in FIG. 15A. Similarly, multiple-arm linkage 103 attaches to carriage mounting piece 41B' through flexure 19 along a line parallel to plane $41B_{P2}$, similar to linear motion stage 500 illustrated in FIG. 15A. In contrast to linear motion stage 500, multiple-arm linkages 102a and 104a in linear motion stage 500a attach to carriage mounting pieces 41A' and 41B' at different locations. For example, multiple-arm linkage 102a attaches to carriage mounting piece 41A' through flexure 14 along a line parallel to $41A_{P2}$ and multiple-arm linkage 104a attaches to carriage mounting piece 41B' through flexure 20 along a line parallel to $41B_{P1}$. Planes $41A_{P1}$, $41A_{P2}$, $41B_{P1}$, and $41B_{P2}$ are parallel to each other and offset some distance from each other along carriage motion line 42.

FIGS. 16A-16C illustrate a top, elevation, and side view of linear-motion stage 500. The multiple-arm linkages 101-104 are not labeled but their respective rigid members and flexures are. FIGS. 16A-16C provide additional perspective views to the other isometric views of linear-motion stage 500.

Figure 17A:
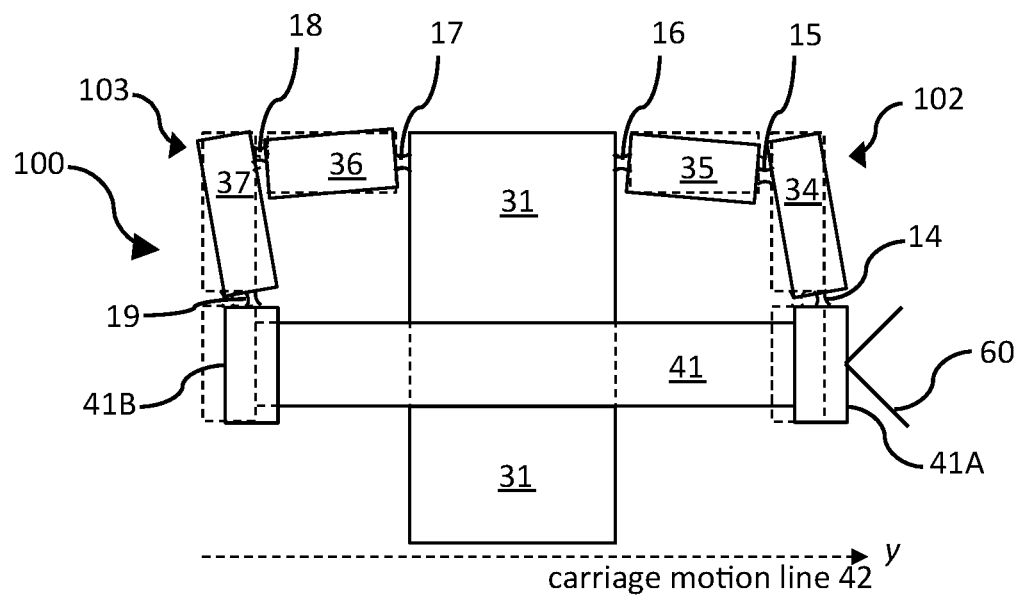
FIGS. 17A-17B illustrate top and elevations views of the linear-motion stage of FIG. 15A in motion.
Figure 17B:
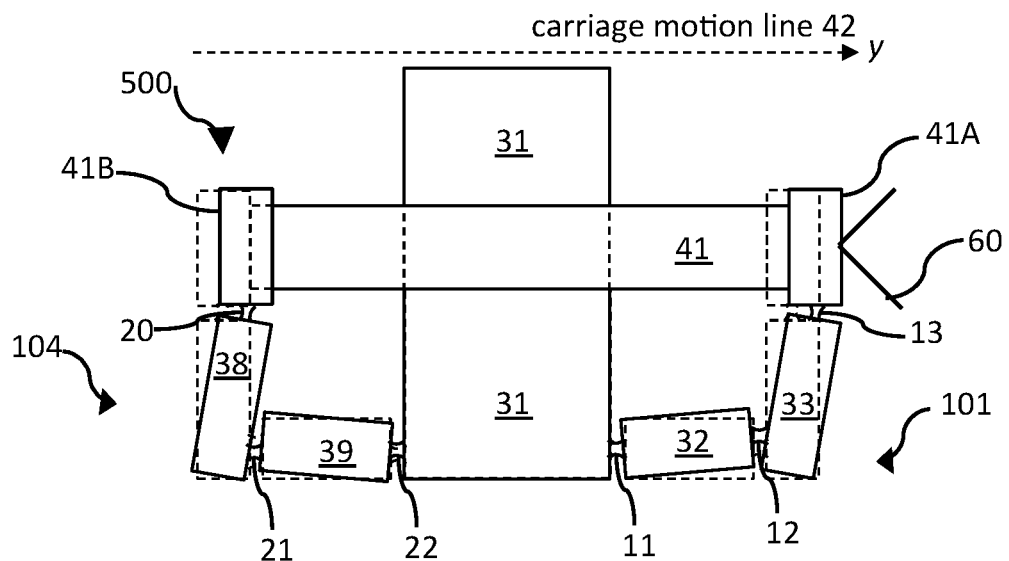

FIGS. 17A and 17B illustrate top and elevation views, respectively, of portions of linear-motion stage 500. For clarity, in FIG. 17A, only multiple-arm linkages 102 and 103, together with carriage 41, carriage ends 41A and 41B, and base 31, are illustrated. Likewise in FIG. 17B, only multiple-arm linkages 101 and 104, together with carriage 41, carriage ends 41A and 41B, and base 31, are illustrated. FIGS. 17A and 17B illustrate the carriage 41 shifted right along the carriage motion line 42. The dashed outlines of rigid elements 32-35 and 38-39 and carriage attachment pieces 41A and 41B are the original positions of the respective members with the carriage 41 at its center position. FIGS. 17A and 17B illustrate how the rigid elements pivot around flexural axes as the carriage 41 moves from a center position to a right position. FIGS. 17A and 17B also illustrate how a corner cube reflector 60, another optics device, or any device may be attached to a carriage attachment piece 41A.

D. A Radially Symmetric Monolithic Linear-Motion Stage

Figure 18A:
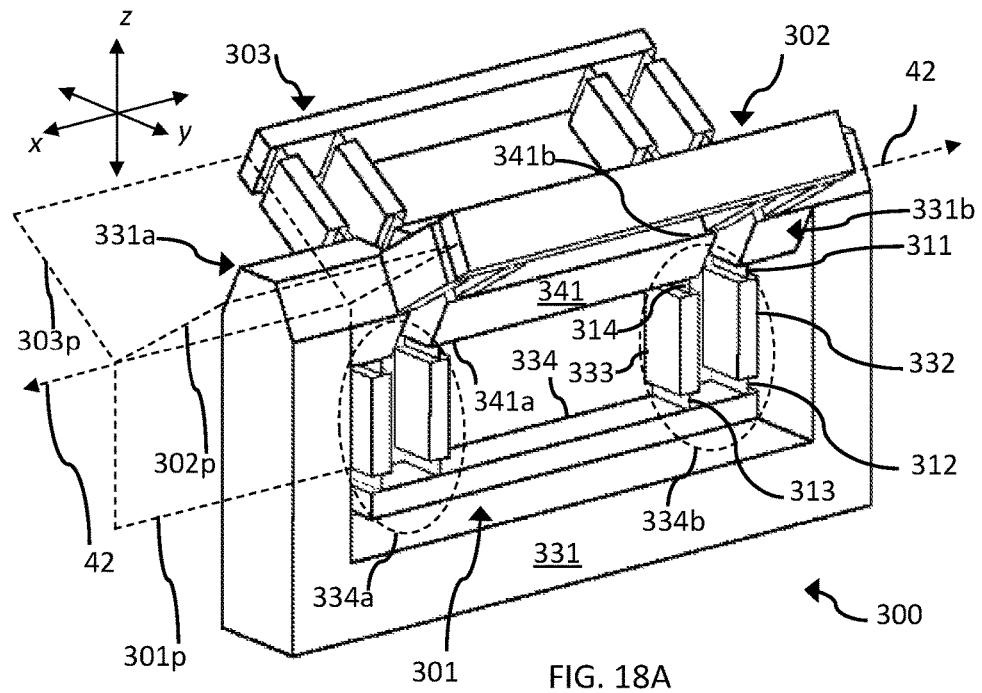
FIG. 18A illustrates an isometric view of an example, angularly and radially symmetrical, three-arm linear-motion stage.
Figure 18B:
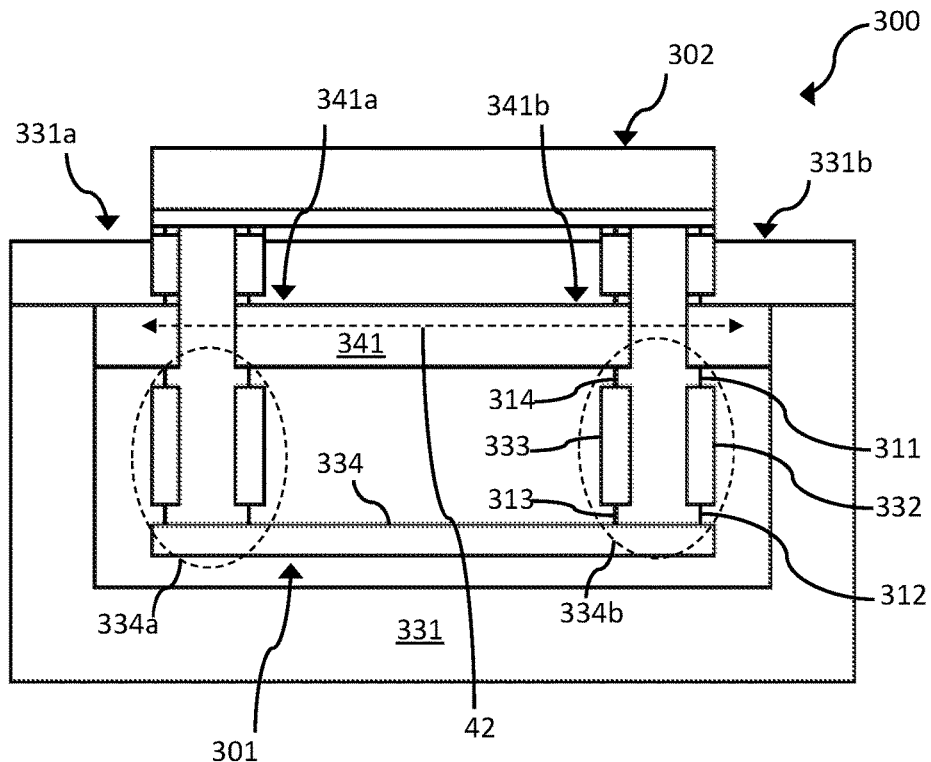
FIG. 18B illustrates a side view of the linear-motion stage in 18A.

FIG. 18A illustrates an isometric view of a three-arm, radially symmetric, monolithic, linear-motion stage 300, also shown in different views in FIGS. 8A-8C. FIG. 18B illustrates an elevation view of linear-motion stage 300. In the elevation view of FIG. 18B, some elements obscure the view of other elements of linear-motion stage 300.

While all elements of multiple-arm linkage 301 are shown, only some elements are numbered in FIGS. 18A and 18B. In this embodiment, linear-motion stage 300 includes a base 331 having a proximal base end 331a and a distal base end 331b. Linear motion stage 300 further comprises a carriage 341 having a proximal carriage end 341a and a distal carriage end 341b. Linear motion stage 300 further includes three multiple-arm linkages 301, 302, and 303. In this embodiment, multiple-arm linkages 301, 302, and 303 each have the same components and configuration. Each multiple-arm linkage 301, 302, and 303 includes a linking rigid element 334 that has a proximal attachment end 334a and a distal attachment end 334b (both circled with a dashed line). For clarity, only the proximal attachment end 334a and the distal attachment end 334b of linking rigid element 334 in multiple arm linkage 301 are labeled in FIG. 18A.

The proximal attachment end 334a connects the proximal base end 331a to the proximal carriage end 341a through the linking rigid element 334. Similarly, the distal attachment end 334b connects the distal base end 331b to the distal carriage end 341b through the linking rigid element 334.

In the illustrated embodiment of linear-motion stage 300, multiple-arm linkages 301, 302, and 303 are homogeneously formed of a single material, having a joint-free continuity of the single material through flexures and rigid elements.

Referring to distal attachment end 334b of multiple-arm linkage 301 in FIGS. 18A and 18B, multiple-arm linkage 301 includes a first flexure 311 extending from the distal base end 331b to a first rigid element 332, a second flexure 312 extending from the first rigid element 332 to the linking rigid element 334, a third flexure 313 extending from the linking rigid element 334 to a second rigid element 333, and a fourth flexure 314 extending from the second rigid element 333 to the distal carriage end 341b. The proximate end 334a of multiple-arm linkage 301 also includes corresponding flexures, the proximal attachment end 334a of linking rigid element 334, and rigid elements that connect the proximal base end 331 through the linking rigid element 334 to the proximal carriage end 341a.

In linear-motion stage 300, multiple-arm linkages 301, 302, and 303 are radially symmetric about the carriage motion line 42, 120 degrees apart from each other. The three multiple-arm linkages 301, 302, and 303 each constrain motion of the carriage 341 to first, second, and third motion-constrained planes, illustrated and labeled as 301p, 302p, and 303p.

The three motion-constrained planes 301p, 302p, and 303p, are illustrated as extending beyond linear motion stage 300 and are further illustrated as being parallel to the carriage-motion line 42. For illustration purposes only, FIG. 18A shows the carriage motion line 42 as extending beyond the base 331, however, the carriage motion, in this illustrated embodiment, does not extend beyond the base 331. In this specific embodiment, motion-constrained planes 301p, 302p, and 303p intersect at carriage-motion line 42. In this illustration, the carriage motion line 42 is parallel to the x-axis. Multiple-arm linkages 301, 302, and 303, combined, constrain motion of the carriage 341 along the carriage motion line 42, or a line parallel to the carriage motion line 42. To properly constrain motion to a line, motion-constrained planes should be parallel to the line; the motion-constrained planes need not intersect at the line.

Figure 19A:
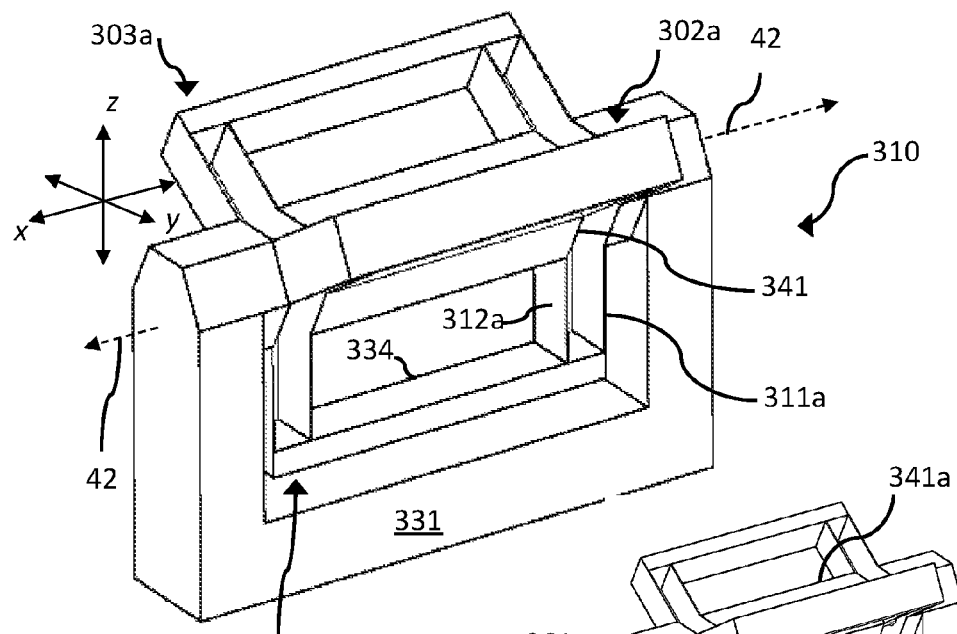
FIG. 19A illustrates an isometric view of another angularly and radially symmetrical, three-arm linear-motion stage.
Figure 19B:
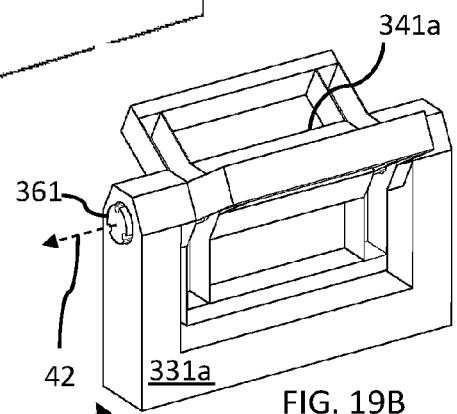
FIG. 19B. illustrates an isometric view of another angularly and radially symmetrical, three-arm linear-motion stage.
Figure 19C:
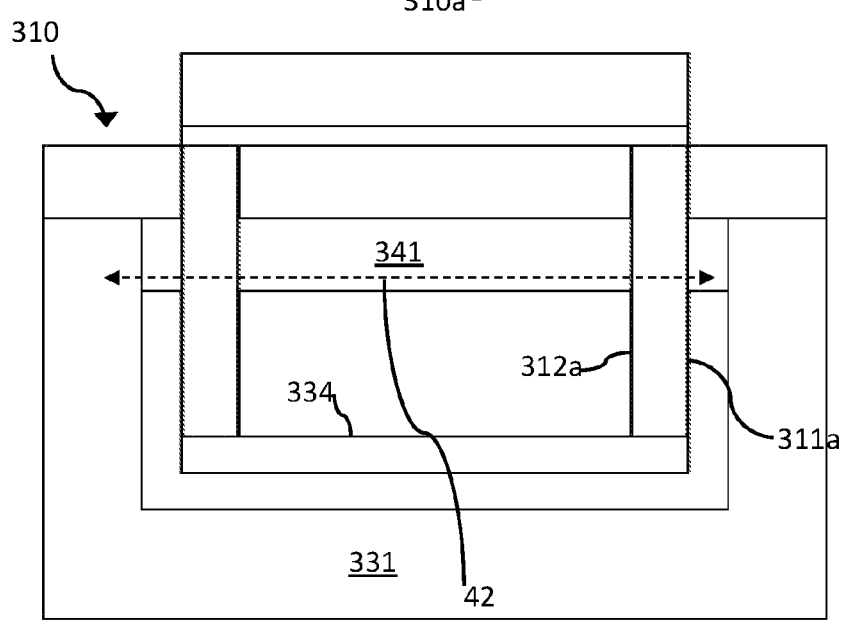
FIG. 19C illustrates a side view of the linear-motion stage in 19A.

FIGS. 19A and 19C illustrate isometric and side views, respectively, of another three-arm radially symmetric monolithic linear-motion stage 310. Like linear-motion stage 300, linear-motion stage 310 includes a base 331 (with proximal and distal base ends not labeled) and three multiple-arm linkages 301a, 302a, and 303a, radially spaced 120 degrees apart from each other around a carriage 341. Each multiple-arm linkage 301a, 302a, and 303a constrains motion of the carriage 341 along a plane parallel to the orientation of the respective multiple arm linkage set. The motion-constrained planes of multiple-arm linkages 301, 302, and 303 are parallel to a carriage-motion line 42, or a line parallel to the carriage motion line 42.

Linear-motion stage 310 differs from linear-motion stage 300 by replacing rigid elements and flexures extending between the base 331 and the linking rigid element 334 of each multiple-arm linkage 301a, 302a, and 303a, with single blade flexures. For example, one end of multiple-arm linkage 301a includes a blade flexure 311a that extends from the base 331 to the linking rigid element 334 and another blade flexure 312a that extends from the linking rigid element 334 to the carriage 341.

FIG. 19B illustrates an isometric view of another three-arm radially symmetric monolithic linear-motion stage 310a. Linear-motion stage 310a includes a shaft 361 that extends from the carriage 341a, through a hole in the base 331a, beyond the base 331a. The shaft 361 may be used to attach any device intended to travel along the carriage motion line 42 with very low tilt or shear. A shaft similar to shaft 361 and a corresponding hole in a base may be added to any linear-motion stage described in this disclosure to enable linear motion travel beyond any base of any linear-motion stage.

FIGS. 20A and 20B illustrate an isometric and side view, respectively, of a four-arm, radially symmetric, monolithic, linear-motion stage 400, also shown in various views in FIGS. 9A-9C. In this embodiment, linear-motion stage 400 includes a base 431, four multiple-arm linkages 401, 402, 403, and 404, and a carriage 441. In the side-elevation view of FIG. 20B, multiple-arm linkage 402 obscures the view of multiple-arm linkage 404.

While all elements of multiple-arm linkage 401 are shown, only some elements are numbered in FIG. 20B. Multiple-arm linkages 401-404 each have the same components and configuration. Referring to the distal end (not circled) of multiple-arm linkage 401 in FIG. 20B, multiple-arm linkage 401 includes a first flexure 411 extending from the base 431 to a first rigid element 432, a second flexure 412 extending from the first rigid element 432 to linking rigid element 434, a third flexure 413 extending from the linking rigid element 434 to a second rigid element 433, and a fourth flexure 414 extending from the second rigid element 433 to the carriage 441. The proximal end (not circled) of multiple-arm linkage 401 also includes corresponding flexures, the proximal end of linking rigid element 434, and rigid elements that connect the base 431 through the linking rigid element 434 to the carriage 441.

In the illustrated embodiment, multiple-arm linkages 401-404 are radially symmetric about the carriage motion line 42 or the carriage 441, 90 degrees apart from each other. Each multiple-arm linkage, 401-404, constrains motion of the carriage 441 along a plane parallel to the orientation of the respective multiple arm linkage. The motion-constrained planes 401p, 402, 403p, and 404p, of multiple-arm linkages 401-404 intersect along a carriage-motion line, or a line parallel to the carriage motion line 42. In FIG. 20A, the carriage motion line 42 is parallel to the x-axis. Multiple-arm linkages 401-404, combined, constrain motion of the carriage 441 along the carriage motion line 42, or a line parallel to the carriage motion line 42.

Figure 21A:
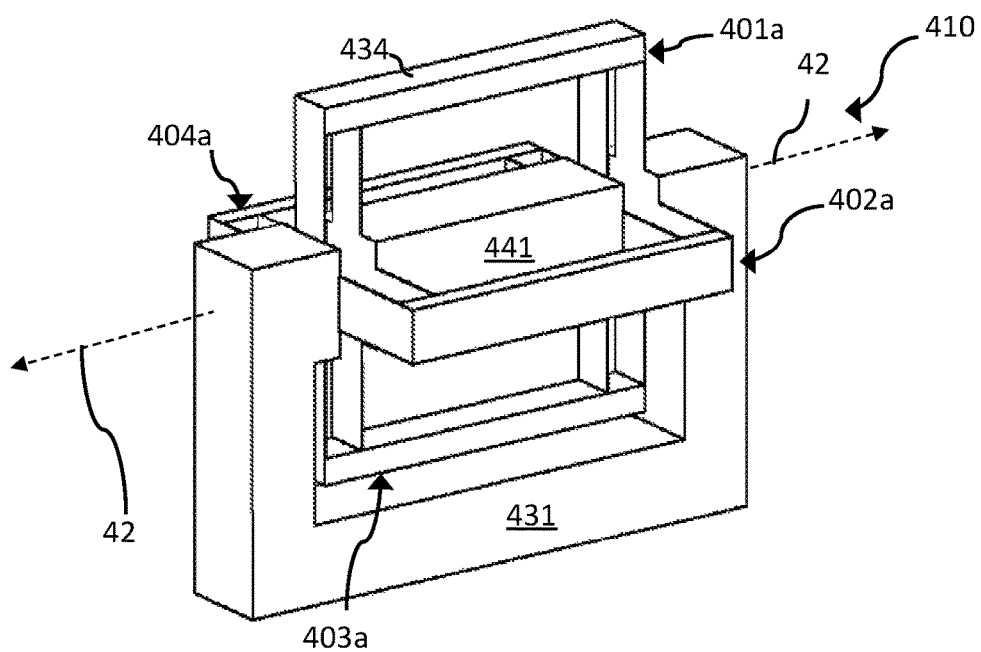
FIG. 21A illustrates an isometric view of another angularly and radially symmetrical, four-arm linear-motion stage.
Figure 21B:
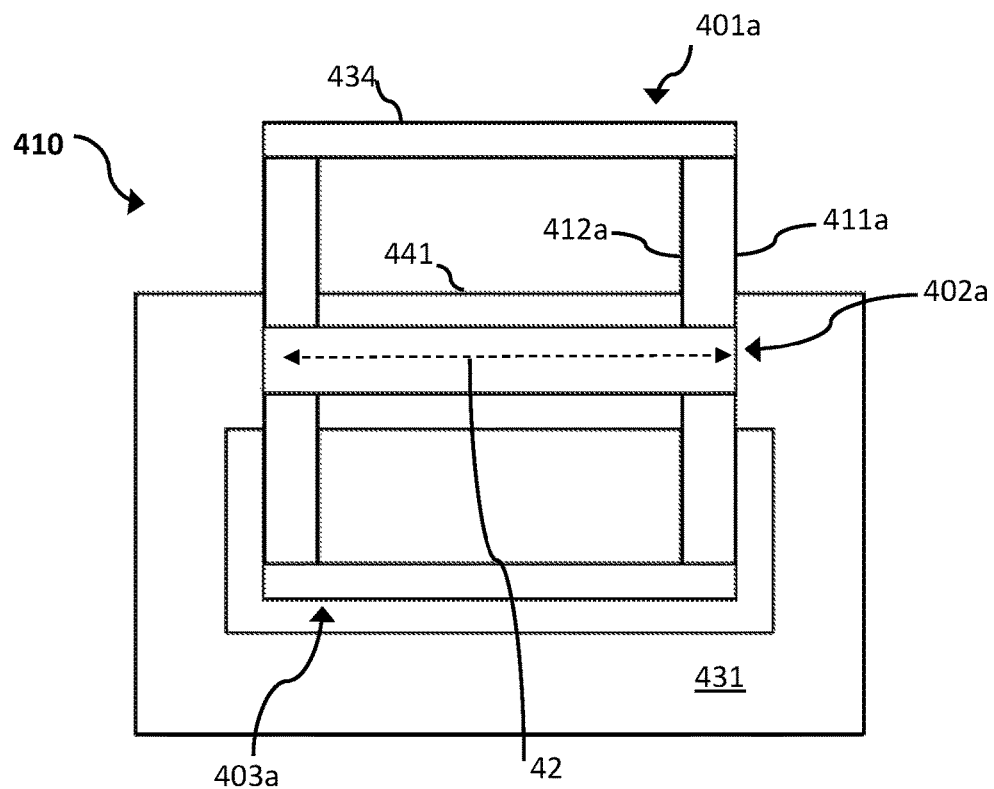
FIG. 21B illustrates a side view of the linear-motion stage in 21A.

FIG. 21A illustrates an isometric view of another four-arm, radially symmetric monolithic, linear-motion stage 410. Like linear-motion stage 400, linear-motion stage 410 includes a base 431 and four multiple-arm linkages 401a, 402a, 403a, and 404a, radially spaced 90 degrees apart from each other around a carriage 441. Each multiple-arm linkage 401a-404a constrains motion of the carriage 441 along a plane parallel to the orientation of the respective multiple-arm linkage. The motion-constrained planes of multiple-arm linkages 401a-404a intersect along a carriage-motion line 42, or a line parallel to the carriage motion line 42.

Linear-motion stage 410 differs from linear-motion stage 400 by replacing rigid elements and flexures extending between the base 431 and the linking rigid elements 434 of each multiple-arm linkage 401a-404a with single blade flexures. For example, multiple-arm linkage 401a includes a blade flexure 411a that extends from the base 431 to the linking rigid element 434 and another blade flexure 412a that extends from the linking rigid element 434 to the carriage 441. The opposite end of multiple-arm linkage 401a also includes corresponding blade flexures and the opposite end of linking rigid element 434 that connect the base 431 through the linking rigid element 434 to the carriage 441.

VIII. Other Linear Motion Stage Embodiments

In other embodiments, a linear-motion stage includes a base; a first multiple-arm linkage extends from the base to a first carriage attachment end; a second multiple-arm linkage extends from the first carriage attachment end to the base; a third multiple-arm linkage extends from the base to a second carriage attachment end; a carriage extends from the first carriage end to the second carriage end. In embodiments, the first multiple-arm linkage constrains a motion of the carriage to motion in a first plane and the second and third multiple-arm linkages constrain the carriage to motion in a second plane, the first and second planes intersect at a plane intersection line. Additionally, the first, second, and third multiple-arm linkages constrain the motion of the carriage along a carriage motion line, the carriage motion line is parallel to the plane intersection line. Also, the first, second, and third multiple-arm linkages comprise a first arm rotateably connected to a second arm through a flexure, the angular travel of the first arm is configured to be different than an angular travel of the second arm as the carriage moves along the carriage motion line.

In other embodiments, at least one of the first, second, or third multiple-arm linkages is homogeneously formed of a single material, having a joint-free continuity of the single material from a first flexure, through a rigid element, to a second flexure. In still another embodiment, the first multiple-arm linkage comprises three first multiple-arm linkage flexures, the three first multiple-arm linkage flexures forming three corresponding first multiple-arm linkage rotation axes that are substantially parallel to each other. Also, the second multiple-arm linkage comprises three, second multiple-arm linkage flexures, the three second multiple-arm linkage flexures forming three corresponding second multiple-arm linkage rotation axes that are substantially parallel to each other and substantially orthogonal to the three first multiple-arm linkage rotation axes. Likewise, the third multiple-arm linkage comprises three third multiple-arm linkage flexures, the three third multiple-arm linkage flexures forming three corresponding third multiple-arm linkage rotation axes that are substantially parallel to each other and the three, second multiple-arm linkage rotation axes.

In another embodiment, a linear-motion stage further comprises an optics device attached to the carriage, the first carriage end, or the second carriage end, and the first, second, and third multiple-arm linkages constrain a motion of the optics device along the carriage motion line. In still other embodiments, each of the first, second, and third multiple-arm linkages comprise a set of three flexures and two rigid elements, wherein each set of the three flexures and two rigid elements are connected in series. Similarly, in other embodiments, the rigid elements have a rigid-element section moduli and the flexures have a flexure-section moduli, the rigid-element section moduli is orders of magnitude greater than the flexure-section moduli.

In another embodiment, a linear-motion stage further comprises a fourth multiple-arm linkage extending from the second carriage end to the base, wherein the fourth multiple-arm linkage constrains the motion of the carriage to motion in the first plane.

In another embodiment of the present disclosure, an apparatus comprises a base; a first carriage end and a carriage extending from the first carriage end to a second carriage end; and first, second, and third multiple arm linkages. The first multiple arm linkage comprises a first flexure extending from the base to a first rigid element; a second flexure extending from the first rigid element to a second rigid element; and a third flexure extending from the second rigid element to the first carriage end. The second multiple-arm linkage comprises a fourth flexure extending from the first carriage end to a third rigid element; a fifth flexure extending from the third rigid element to a fourth rigid element; and a sixth flexure extending from the fourth rigid element to the base. A third multiple-arm linkage comprises a seventh flexure extending from the base to a fifth rigid element; an eighth flexure extending from the fifth rigid element to a sixth rigid element; and a ninth flexure extending from a sixth rigid element to the second carriage end. In this embodiment, the first, second, and third flexures form a corresponding first, second, and third axis that are substantially parallel to each other. Similarly, the fourth, fifth, and sixth flexures form a corresponding fourth, fifth, and sixth axis that are substantially parallel to each other and substantially orthogonal to the first, second, and third axis. Finally, the seventh, eighth, and ninth flexures form a corresponding seventh, eighth, and ninth axis that are substantially parallel to each other and the fourth, fifth, and sixth axes.

In another embodiment of the present disclosure, a linear-motion stage comprises a base; a first multiple-arm linkage extending from the base to a carriage end; a second multiple-arm linkage extending from the carriage end to the base; an optics device attached to the carriage end. In this embodiment, the first multiple-arm linkage constrains a motion of the optics device to motion in a first plane and the second multiple-arm linkage constrains the optics device to motion in a second plane, the first and second planes intersecting at a plane intersection line. Also, the first and second multiple-arm linkages constrain the motion of the optics device along a carriage motion line, the carriage motion line being parallel to the plane intersection line. Similarly, the carriage attachment piece and the optics device are fully balanced such that a combined center of gravity of the carriage attachment piece and the optics device is located in a balancing plane formed by a first flexure extending from the first multiple-arm linkage to the carriage end and a second flexure extending from the carriage end to the second multiple-arm linkage.

In another embodiment, at least one of the first or second multiple-arm linkages is homogeneously formed of a single material, having a joint-free continuity of the single material from a first flexure, through a rigid element, to a second flexure. In still another embodiment, the first multiple-arm linkage comprises three first multiple-arm linkage flexures, the three first multiple-arm linkage flexures forming three corresponding first multiple-arm linkage rotation axes that are substantially parallel to each other. Similarly, the second multiple-arm linkage comprises three, second multiple-arm linkage flexures, the three, second multiple-arm linkage flexures forming three corresponding second multiple-arm linkage rotation axes that are substantially parallel to each other and substantially orthogonal to the three first multiple-arm linkage rotation axes.

In another embodiment, each of the first and second multiple-arm linkages comprise a set of three flexures and two rigid elements, wherein each set of the three flexures and two rigid elements are connected in series. In another embodiment, each set of the three flexures and the two rigid elements are connected in the following order: a first flexure, a first rigid element, a second flexure, a second rigid element, and a third flexure. In another embodiment, the rigid elements have a rigid-element section moduli and the flexures have a flexure-section moduli, the rigid-element section moduli being orders of magnitude greater than the flexure-section moduli.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

Unless otherwise noted, the terms "a" or "an," as used in the specification and claims, are to be construed as meaning "at least one of." In addition, fore ease of use, the words "including" and "having," as used in the specification and claims, are interchangeable with and have the same meaning as the word "comprising."

What is claimed is:

1. A linear-motion stage comprising:
a base;
a first multiple-arm linkage extending from the base to a first carriage attachment end;
a second multiple-arm linkage extending from the first carriage attachment end to the base;
a third multiple-arm linkage extending from the base to a second carriage attachment end; and
a carriage extending from the first carriage end to the second carriage end;
wherein:
the first multiple-arm linkage constrains a motion of the carriage to motion in a first plane and the second and third multiple-arm linkages constrain the motion of the carriage to motion in a second plane, the first and second planes intersecting at a plane intersection line;
the first, second, and third multiple-arm linkages constrain the motion of the carriage along a carriage motion line, the carriage motion line being substantially parallel to the plane intersection line; and
the first, second, and third multiple-arm linkages comprise a first arm rotateably connected to a second arm through a flexure, the angular travel of the first arm is configured to be different than an angular travel of the second arm as the carriage moves along the carriage motion line.

2. The linear-motion stage of claim 1, wherein:
at least one of the first, second, or third multiple-arm linkages is homogeneously formed of a single material, having a joint-free continuity of the single material from a first flexure, through a rigid element, to a second flexure.

3. The linear-motion stage of claim 1, wherein:
the first multiple-arm linkage comprises three first multiple-arm linkage flexures, the three first multiple-arm linkage flexures forming three corresponding first multiple-arm linkage rotation axes that are substantially parallel to each other;
the second multiple-arm linkage comprises three, second multiple-arm linkage flexures, the three second multiple-arm linkage flexures forming three corresponding second multiple-arm linkage rotation axes that are substantially parallel to each other and substantially orthogonal to the three first multiple-arm linkage rotation axes; and
the third multiple-arm linkage comprises three third multiple-arm linkage flexures, the three third multiple-arm linkage flexures forming three corresponding third multiple-arm linkage rotation axes that are substantially parallel to each other and the three, second multiple-arm linkage rotation axes.

4. The linear-motion stage of claim 1, further comprising an optics device attached to the carriage, the first carriage end, or the second carriage end, and the first, second, and third multiple-arm linkages constrain a motion of the optics device along the carriage motion line.

5. The linear-motion stage of claim 1, wherein, each of the first, second, and third multiple-arm linkages comprise a set of three flexures and two rigid elements, wherein each set of the three flexures and two rigid elements are connected in series.

6. The linear-motion stage of claim 1, wherein the rigid elements have a rigid-element section moduli and the flexures have a flexure-section moduli, the rigid-element section moduli is orders of magnitude greater than the flexure-section moduli.

7. The linear-motion stage of claim 1, further comprising a fourth multiple-arm linkage extending from the second carriage end to the base, wherein the fourth multiple-arm linkage constrains the motion of the carriage to motion in the first plane.

8. A linear-motion stage, comprising:
a base;
a first multiple-arm linkage extending from the base to a carriage end;
a second multiple-arm linkage extending from the carriage end to the base; and
an optics device attached to the carriage end;
wherein:
the first multiple-arm linkage constrains a motion of the optics device to motion in a first plane and the second multiple-arm linkage constrains the motion of the optics device to motion in a second plane, the first and second planes intersecting at a plane intersection line;
the first and second multiple-arm linkages constrain the motion of the optics device along a carriage motion line, the carriage motion line being parallel to the plane intersection line; and the carriage end and the optics device are fully balanced such that a combined center of gravity of the carriage end and the optics device is located in a balancing plane formed by a first flexure extending from the first multiple-arm linkage to the carriage end and a second flexure extending from the carriage end to the second multiple-arm linkage.

9. The linear-motion stage of claim 8, wherein at least one of the first or second multiple-arm linkages is homogeneously formed of a single material, having a joint-free continuity of the single material from a first flexure, through a rigid element, to a second flexure.

10. The linear-motion stage of claim 8, wherein:
the first multiple-arm linkage comprises three first multiple-arm linkage flexures, the three first multiple-arm linkage flexures forming three corresponding first multiple-arm linkage rotation axes that are substantially parallel to each other; and
the second multiple-arm linkage comprises three, second multiple-arm linkage flexures, the three, second multiple-arm linkage flexures forming three corresponding second multiple-arm linkage rotation axes that are substantially parallel to each other and substantially orthogonal to the three first multiple-arm linkage rotation axes.

11. The linear-motion stage of claim 8, wherein each of the first and second multiple-arm linkages comprise a set of three flexures and two rigid elements, wherein each set of the three flexures and two rigid elements are connected in series.

12. The linear-motion stage of claim 11, wherein each set of the three flexures and the two rigid elements are connected in the following order: a first flexure, a first rigid element, a second flexure, a second rigid element, and a third flexure.

13. The linear-motion stage of claim 11, wherein the rigid elements have a rigid-element section moduli and the flexures have a flexure-section moduli, the rigid-element section moduli being orders of magnitude greater than the flexure-section moduli.

* * * * *